US012707178B2

(12) United States Patent
Xilin

(10) Patent No.: US 12,707,178 B2
(45) Date of Patent: Aug. 11, 2026

(54) INTELLIGENT AUDIO DEVICE AND METHOD FOR CONTROLLING AUTOMATIC LIFTING OF SOUND COLUMN

(71) Applicant: Guangdong Taide Zhilian Technology Co., Ltd., Dongguan City (CN)

(72) Inventor: Xie Xilin, Dongguan City (CN)

(73) Assignee: Guangdong Taide Zhilian Technology Co., Ltd., Dongguan City (CN)

(*) Notice: Subject to any disclaimer, the term of this patent is extended or adjusted under 35 U.S.C. 154(b) by 0 days.

(21) Appl. No.: 19/347,645

(22) Filed: Oct. 1, 2025

(65) Prior Publication Data

US 2026/0149904 A1 May 28, 2026

(30) Foreign Application Priority Data

Nov. 25, 2024 (CN) ......................... 202411691920.2

(51) Int. Cl.
*H04R 1/02* (2006.01)

(52) U.S. Cl.
CPC ............. *H04R 1/025* (2013.01); *H04R 1/023* (2013.01); *H04R 2201/025* (2013.01)

(58) Field of Classification Search
CPC ... H04R 1/025; H04R 1/023; H04R 2201/025
See application file for complete search history.

(56) References Cited

U.S. PATENT DOCUMENTS

| | | | | |
|---|---|---|---|---|
| 5,321,760 A * | 6/1994 | Gray | H04R 1/026 | 381/86 |
| 6,343,135 B1 * | 1/2002 | Ellero | H04R 1/025 | 381/345 |
| 6,754,916 B1 * | 6/2004 | Cox | A61H 33/02 | 4/546 |
| 8,175,318 B2 * | 5/2012 | Pieklik | A61H 33/60 | 381/387 |
| 8,867,771 B2 * | 10/2014 | Mei | H04R 1/02 | 381/345 |
| 9,936,272 B1 * | 4/2018 | Ibrahim | H04R 23/02 | |
| 2004/0156517 A1 * | 8/2004 | Schmidt | H04R 1/028 | 381/345 |
| 2011/0129109 A1 * | 6/2011 | Okutsu | H04R 1/025 | 381/332 |

(Continued)

*Primary Examiner* — Suhan Ni

(74) *Attorney, Agent, or Firm* — COOPER LEGAL GROUP LLC

(57) ABSTRACT

An intelligent audio device and a method for controlling automatic lifting of a sound column. The intelligent audio device includes a sound column assembly, an enclosure and a drive assembly; the enclosure is configured with at least one first accommodation space; one end of the first accommodation space extends to an outer wall of the enclosure to form a first opening; the drive assembly connected to the sound column assembly; the drive assembly is able to drive the sound column assembly to reciprocate between a first position and a second position; wherein, when the sound column assembly is located at the first position, the sound column assembly is located in the first accommodation space; when the sound column assembly is located at the second position, the sound column assembly is at least partially located outside the first accommodation space.

13 Claims, 23 Drawing Sheets

(56) References Cited

U.S. PATENT DOCUMENTS

| | | | | |
|---|---|---|---|---|
| 2016/0153690 | A1* | 6/2016 | Patsis | H04R 1/025 220/592.2 |
| 2019/0106039 | A1* | 4/2019 | Winton | H04R 5/023 |
| 2019/0149907 | A1* | 5/2019 | Größler | H04R 1/26 381/335 |

* cited by examiner

INTELLIGENT AUDIO DEVICE AND METHOD FOR CONTROLLING AUTOMATIC LIFTING OF SOUND COLUMN

CROSS-REFERENCE TO RELATED APPLICATIONS

This application claims the priority and benefit of Chinese patent application No. 202411691920.2, filed on Nov. 25, 2024. The entirety of Chinese patent application No. 202411691920.2 is hereby incorporated by reference herein and made a part of this specification.

TECHNICAL FIELD

The present disclosure relates to the field of audio technology, and in particular to an intelligent audio device and a method for controlling automatic lifting of a sound column.

BACKGROUND ART

At present, for speakers used in larger spaces such as conference rooms and concert venues, it is usually necessary to set an overall longer sound column on the speaker. The sound column has sound-producing devices such as a loudspeaker. The sound column can be configured to expand the sound field of the speaker. The existing sound column and the speaker are usually provided separately. When the sound column is needed, the sound column speaker and the speaker need to be plugged into each other to expand the sound field of the speaker. However, since the sound column needs to be plugged in each time it is used, it is inconvenient to use. The steps of repeatedly plugging the sound column will cause the structure to be loose, which affects the stability of use.

SUMMARY

To this end, the present disclosure provides an intelligent audio device and a method for controlling automatic lifting of a sound column, which solves the technical problem that the sound column needs to be plugged in every time it is used, which is inconvenient to use.

To achieve the above object, the present disclosure specifically provides the following technical solutions: an intelligent audio device including: a sound column assembly; an enclosure configured with at least one first accommodation space, wherein one end of the first accommodation space extends to an outer wall of the enclosure to form a first opening, the first accommodation space is configured to accommodate the sound column assembly; a drive assembly connected to the sound column assembly, wherein the drive assembly is configured to drive the sound column assembly to reciprocate between a first position and a second position; wherein, when the sound column assembly is located at the first position, the sound column assembly is located in the first accommodation space; when the sound column assembly is located at the second position, the sound column assembly is at least partially located outside the first accommodation space.

Optionally, the sound column assembly includes a sound column body and a sound column housing; the sound column body is connected to the sound column housing; the drive assembly drives at least one of the sound column housing or the sound column body, so that the sound column body or the sound column housing moves.

Optionally, the sound column housing is arranged to be penetrated through and sleeved outside the sound column body; the sound column body is slidably connected to the sound column housing and is able to slide relative to the sound column housing along a first direction; the drive assembly is connected to the sound column body and the sound column housing, the drive assembly is able to drive the sound column housing to at least partially move from the first opening outside the first accommodation space, and is able to drive the sound column body to at least partially move outside the sound column housing.

Optionally, the drive assembly includes a drive member and a first screw rod; the first screw rod is threadedly connected to the sound column housing; the drive member drives the first screw rod, so that the first screw rod rotates around a first direction.

Optionally, the drive assembly further includes a second screw rod; the drive member drives the second screw rod, so that the second screw rod is able to rotate; the second screw rod is threadedly connected to the sound column body.

Optionally, the second screw rod is rotatably connected to the sound column housing; the second screw rod is arranged to be penetrated through, the second screw rod is slidably sleeved on the second screw rod; at least one of the first screw rod or the second screw rod is configured with a chute, at least another one of the second screw rod or the first screw rod is configured with a slider; the slider is slidably arranged in the chute; an extension direction of the chute is arranged in the same direction as an axial direction of the first screw rod.

Optionally, the drive assembly includes a third screw rod and a drive member, the drive member drives the third screw rod;

the sound column assembly includes a sound column body and a sound column housing, the sound column body is connected to the sound column housing, the third screw rod is threadedly connected to at least one of the sound column housing or the sound column body, the drive member drives the third screw rod to rotate, so as to drive the sound column housing and the sound column body to reciprocate, or, the sound column assembly includes a sound column body, the third screw rod is threadedly connected to the sound column body, the drive member drives the third screw rod to rotate, so as to drive the sound column body to reciprocate.

Optionally, the sound column housing includes a first main body and a first nut; the first nut is fixedly connected to the first main body and is threadedly connected to the first screw rod; the sound column body includes a second main body and a second nut; the second nut is fixedly connected to the second main body and is threadedly connected to the second screw rod.

Optionally, the first main body is configured with a first through opening, and the second main body is configured with a second through opening; the first through opening and the second through opening are arranged opposite to each other; the first nut is arranged at the first through opening; the second nut is arranged at the second through opening; the first screw rod is arranged through the first through opening, and the first screw rod is at least partially located in the first main body; the second screw rod is arranged through the second through opening, and the second screw rod is at least partially located in the second main body.

Optionally, the sound column housing includes a first main body, a connect member and a limit, wherein the connect member is connected to the second screw rod, the limit member is connected to the first main body, and a placement cavity is defined between the limit member and the first main body; and the connect member is rotatably arranged in the placement cavity.

Optionally, the enclosure is further configured with a second accommodation space; the second accommodation space is communicated with the first accommodation space, or the second accommodation space is separated from the first accommodation space.

Optionally, the second accommodation space is communicated with the first accommodation space; one end of the sound column housing is connected to the sound column body; when the sound column body is located in the second position, one end of the sound column housing away from the sound column body is located between the sound column body and the enclosure.

Optionally, a cross-section of the first opening, a cross-section of the sound column body and a cross-section of the sound column housing are all non-circular cross-sections.

Optionally, the screen assembly includes a screen, and the screen is movably connected to the enclosure.

Optionally, the enclosure is configured with a storage area, and the storage area is configured to store the screen.

Optionally, the screen assembly also includes a movable connection member; the storage area and the first opening are both located on an end surface of the enclosure, the storage area is located on one side of the first opening, and the movable connection member is arranged at a first mount position or a second mount position of the storage area; the second mount position is located away from the first opening relative to the first mount position and is spaced apart from the first mount position.

The method for controlling automatic lifting of a sound column according to the second aspect of the present disclosure includes the following steps:

S1: the sound column rises when a first preset condition is detected;

S2: the sound column adjusts the height when a second preset condition is detected;

S3: the sound column descends when a third preset condition is detected.

Optionally, the first preset condition includes at least one of the following: a power supply is turned on; the power supply is turned on and the sound column receives a rise instruction; the power supply is turned on and an environment meets a rise condition; the second preset condition includes: at least one of audio information of a file content or environment parameters of a playback space; the third preset condition includes at least one of the following: the power supply is turned off, a capacity of the power supply is less than or equal to a preset value of the power supply; the power supply is turned on and the sound column receives a descend instruction; the power supply is turned on and the environment meets a descend condition.

Compared with the existing technology, the present disclosure has the following beneficial effects: the sound column assembly is located in the first accommodation space, and the enclosure can accommodate the sound column assembly in the first accommodation space. When the sound column assembly needs to be used, the drive assembly can drive the sound column assembly to move from the first position to the second position. When the sound column assembly is located in the second position, the sound column assembly is at least partially located outside the first accommodation space, so that the sound column assembly can be used normally. The drive assembly can also drive the sound column assembly to move from the second position to the first position, so that when the sound column assembly is located in the first position, the sound column assembly is moved to the first accommodation space, so as to accommodate the sound column assembly. Compared with the sound column and speaker in plug-in form, the intelligent audio device of the present disclosure can drive the sound column assembly to move and reciprocate between the first position and the second position through the drive assembly, which is more convenient to use and has better stability in use. It can intelligently convert the sound field and adjust the degree of freedom. Moreover, since the intelligent audio device of the present disclosure is connected to the sound column assembly through the drive assembly, it can be used immediately without assembling the sound column assembly. It is more convenient to use. In addition, since there is no need for separate packaging and transportation, the transportation cost can be reduced.

BRIEF DESCRIPTION OF THE DRAWINGS

In order to more clearly illustrate the embodiments of the present disclosure or the technical solutions in the existing technology, the drawings required for use in the embodiments, or the description of the existing technology will be briefly introduced below. Obviously, the drawings described below are only some embodiments of the present disclosure. For ordinary skilled in the art, other drawings can be obtained based on these drawings without paying for creative labor.

Figure 1:
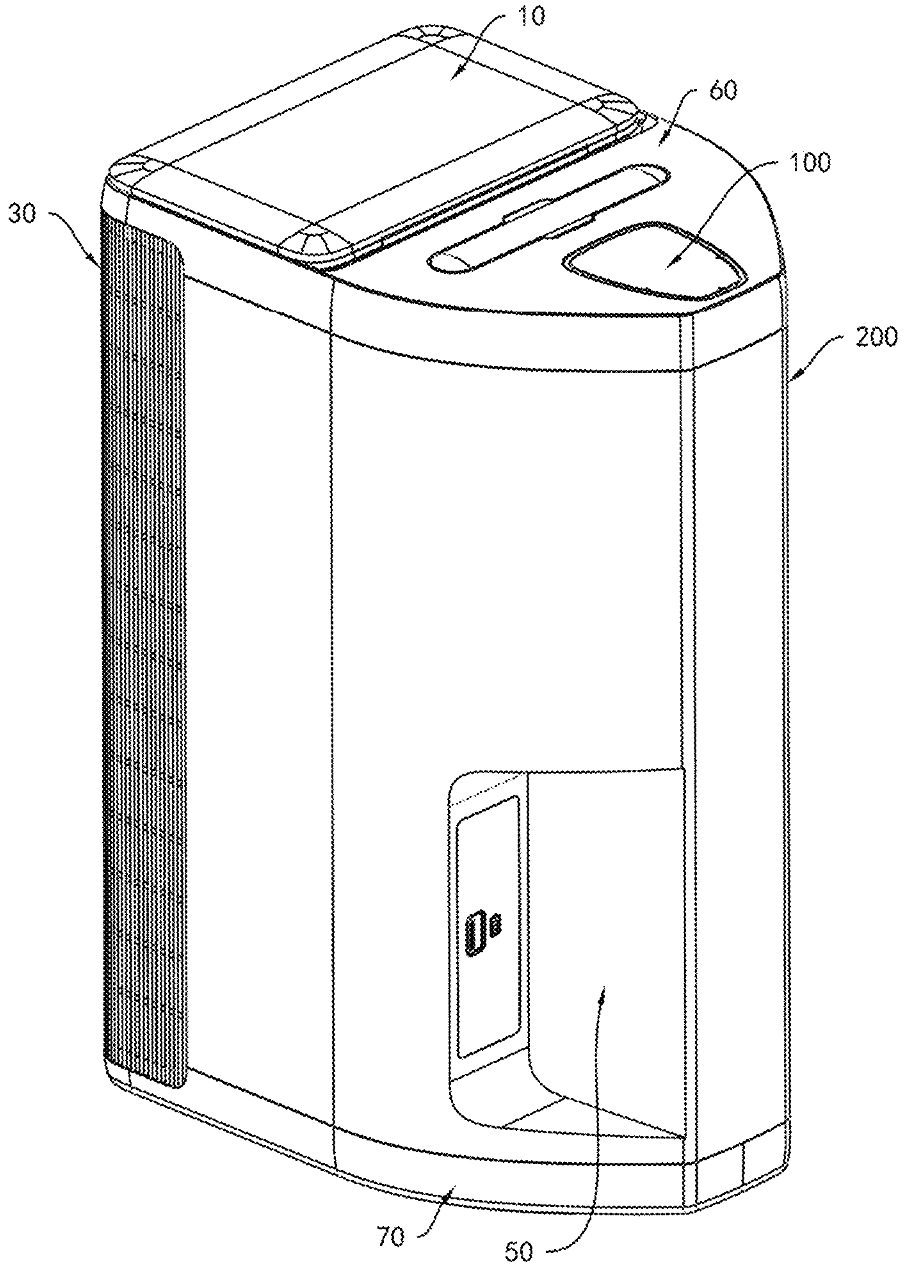
FIG. 1 is a schematic structural diagram of an intelligent audio device provided by an embodiment of the present disclosure with a sound column assembly in a first position.

REFERENCE SIGNS screen 10; air duct 20; front mesh housing 30; loudspeaker assembly 40; recess 50; top housing 60; bottom housing 70; microphone 80; sound column assembly 100; slide block 101; slide groove 102; sound column housing 110; first main body 111; first nut 112; first through opening 113; connect member 114; limit member 116; placement cavity 117; housing main body 118; base 119; sound column body 120; second main body 121; second nut 122; second through opening 123; third screw rod 130; enclosure 200; first accommodation space 210; first opening 220; second accommodation space 230; storage area 240; first housing 201; second housing 202; drive assembly 300; drive member 301; chute 302; slider 303; first screw rod 310; second screw rod 320.

DETAILED DESCRIPTION

In order to make the objects, features and advantages of the disclosure more obvious and understandable, the technical solutions in the embodiments of the present disclosure will be clearly and completely described below in conjunction with the accompanying drawings in the embodiments of the present disclosure. Obviously, the described embodiments below are only part of the embodiments of the present disclosure, rather than all the embodiments. Based on the embodiments of the present disclosure, all other embodiments obtained by those of ordinary skill in the art without making any creative work shall fall within the scope of protection of the present disclosure.

The technical solution of the present disclosure is further described below with reference to the accompanying drawings and through specific implementation.

In the description of the present disclosure, it is necessary to understand that the orientations or positional relationships indicated by the terms "upper", "lower", "top", "bottom", "inside", "outside", etc. are based on the orientations or positional relationships shown in the accompanying drawings, and are only for the convenience of describing the present disclosure and simplifying the description, rather than indicating or implying that the device or element referred to must have a specific orientation, be constructed and operated in a specific orientation, and therefore cannot be understood as a limitation on the present disclosure.

An intelligent audio device and a method for controlling automatic lifting of a sound column according to the present disclosure will be described with reference to FIGS. 1 to 39 below.

The intelligent audio device according to an embodiment of the first aspect of the present disclosure includes a sound column assembly 100, an enclosure 200 and a drive assembly 300; the enclosure 200 is configured with at least one first accommodation space 210; one end of the first accommodation space 210 extends to an outer wall of the enclosure 200 to form a first opening 220; the first accommodation space 210 is configured to accommodate the sound column assembly 100; the drive assembly 300 connected to the sound column assembly 100; the drive assembly 300 is able to drive the sound column assembly 100 to reciprocate between a first position and a second position. In particular, when the sound column assembly 100 is located at the first position, the sound column assembly 100 is located in the first accommodation space 210; when the sound column assembly 100 is located at the second position, the sound column assembly 100 is at least partially located outside the first accommodation space 210.

The sound column assembly 100 is located in the first accommodation space 210, and the enclosure 200 can accommodate the sound column assembly 100 in the first accommodation space 210. When the sound column assembly 100 needs to be used, the drive assembly 300 can drive the sound column assembly 100 to move from the first position to the second position. When the sound column assembly 100 is located in the second position, the sound column assembly 100 is at least partially located outside the first accommodation space 210, so that the sound column assembly 100 can be used normally. The drive assembly 300 can also drive the sound column assembly 100 to move from the second position to the first position, so that when the sound column assembly 100 is located in the first position, the sound column assembly 100 is moved to the first accommodation space 210, so as to accommodate the sound column assembly 100. Compared with the sound column and speaker in plug-in form, the intelligent audio device of the present disclosure can drive the sound column assembly 100 to move and reciprocate between the first position and the second position through the drive assembly 300, which is more convenient to use and has better stability in use. It can intelligently convert the sound field and adjust the degree of freedom. Moreover, since the intelligent audio device of the present disclosure is connected to the sound column assembly 100 through the drive assembly 300, it can be used immediately without assembling the sound column assembly 100. It is more convenient to use. In addition, since there is no need for separate packaging and transportation, the transportation cost can be reduced.

Figure 3:
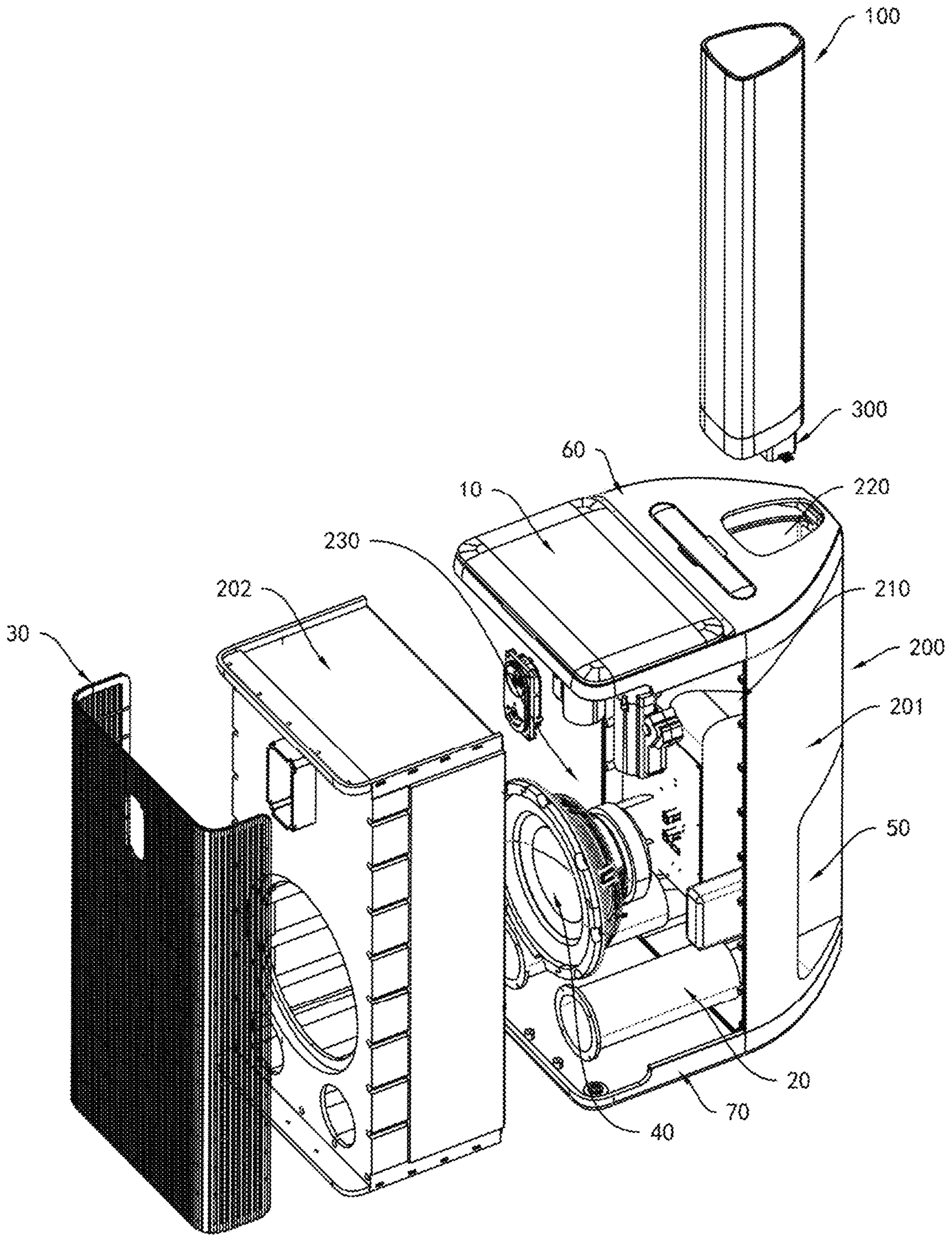
FIG. 3 is an exploded view of an intelligent audio device provided by an embodiment of the present disclosure.
Figure 4:
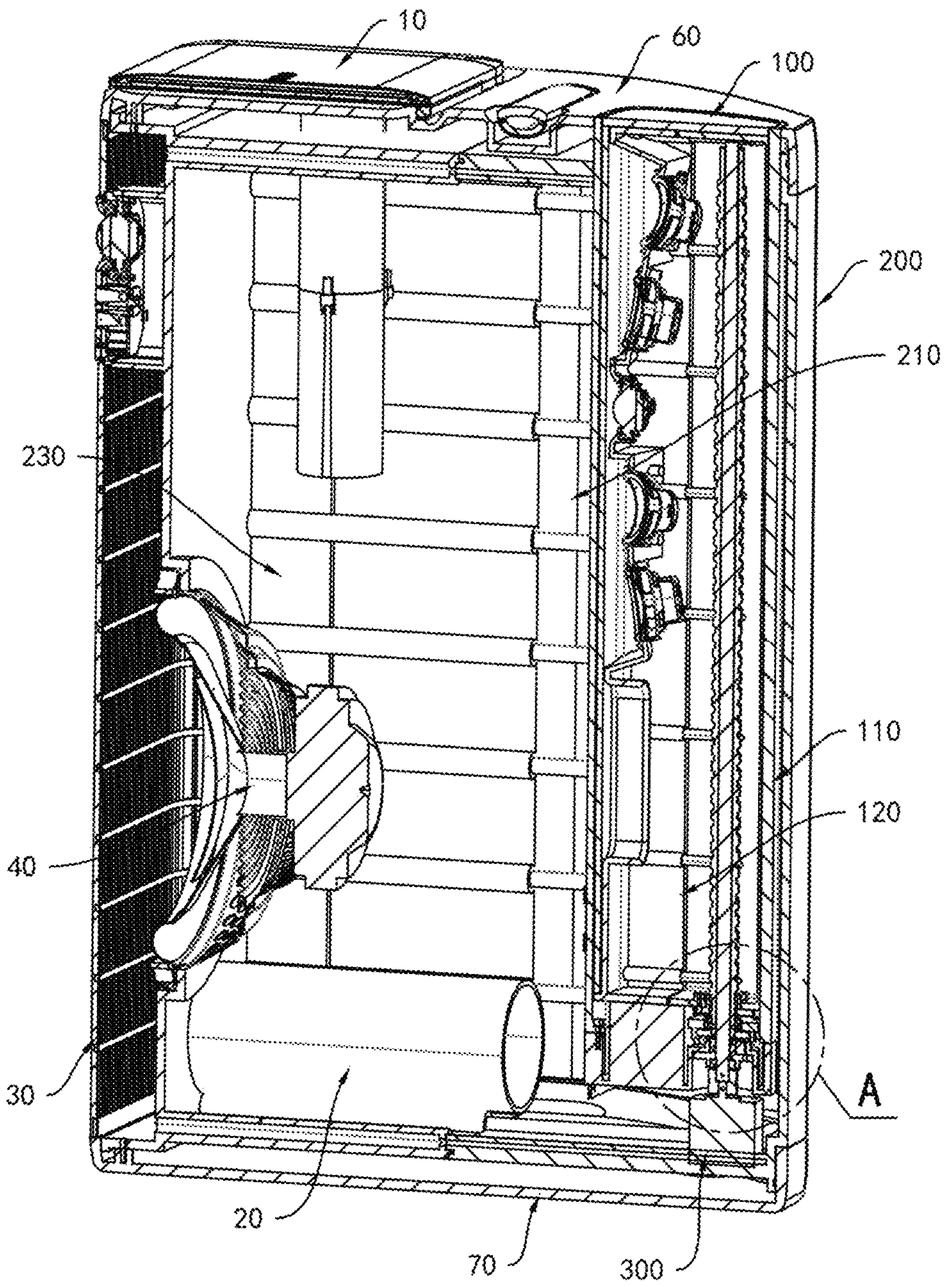
FIG. 4 is a sectional view of an intelligent audio device provided by an embodiment of the present disclosure.

Specifically, referring to FIG. 3 and FIG. 4, the first accommodation space 210 can be a cavity structure formed by five or fewer sides. In particular, the first accommodation space 210 can be a cavity structure formed by four sides. It can be understood that the first accommodation space 210 can also be a groove structure. It should be emphasized that after the sound column assembly 100 is stored, the sound output direction of the sound column assembly 100 before and after the storage remains unchanged, and the sound column assembly 100 is completely stored in the enclosure 200, and the stored sound column assembly 100 cannot be seen from the outside of the enclosure 200.

Figure 2:
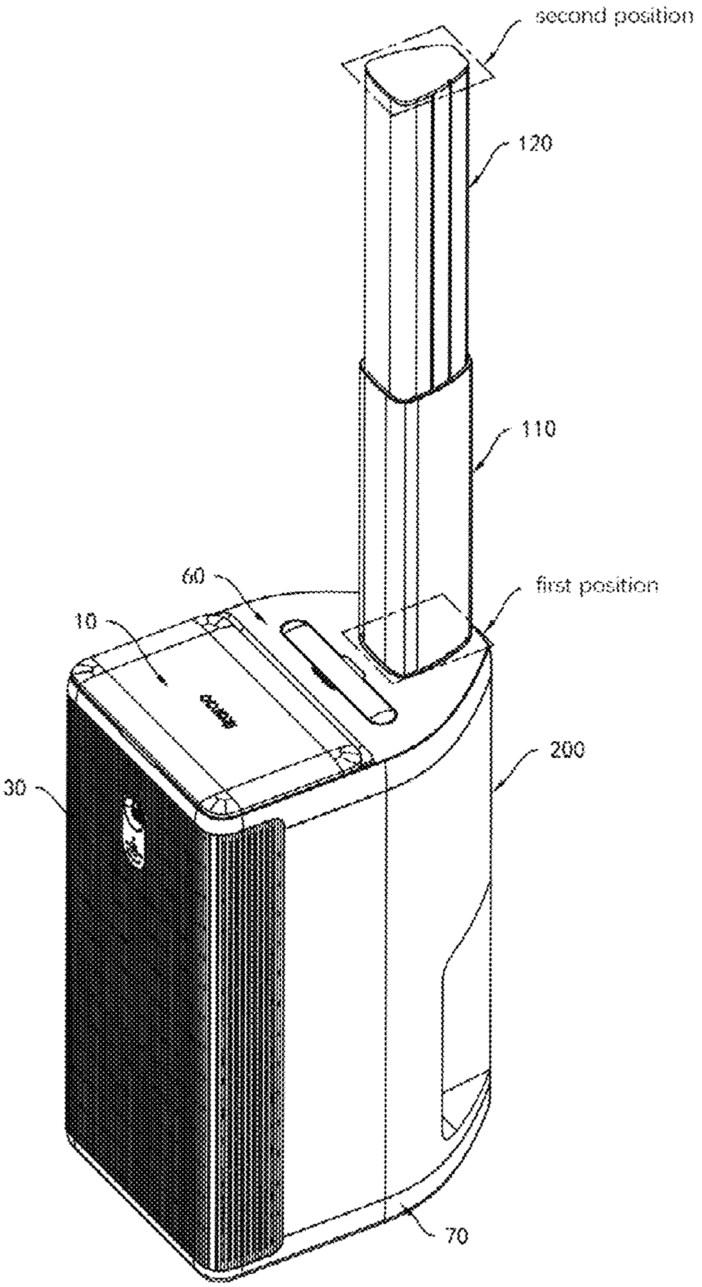
FIG. 2 is a schematic structural diagram of an intelligent audio device provided by an embodiment of the present disclosure with a sound column assembly in a second position.

Specifically, referring to FIG. 2, the first position is the horizontal plane position of the first opening 220, and the second opening is a preset height position from the horizontal plane of the first opening 220 or the bottom of the speaker; taking the horizontal plane from the first opening 220 as an example, the preset height position may be 75 cm to 120 cm.

Specifically, the top surface of the sound column assembly 100 is used as a determination condition. When the sound column assembly 100 is located at the first position, the top surface of the sound column assembly 100 is located at or below the first position. When the sound column assembly 100 is located at the second position, the distance between the top surface of the sound column assembly 100 located at the second position and the first position is the preset distance.

Specifically, the drive assembly 300 drives the sound column assembly 100 to move, so that the sound column assembly 100 is at least partially located outside the first accommodation space 210. In particular, the drive assembly 300 drives the sound column assembly 100 to move out of the first accommodation space 210 in a vertical direction, or in a horizontal direction. It can be understood that, it can move out of the first accommodation space 210 in any direction.

Specifically, the first opening 220 may be an always-open structure, i.e. which is never closed, so that the sound column assembly 100 can extend in and out from the first opening 220 without hindrance. After the sound column assembly 100 is stored in the first accommodation space 210, a top end of the sound column assembly 100 can occupy the first opening 220, so as to prevent foreign matter from falling into the first accommodation space 210 from the first opening 220. It can be understood that, according to specific circumstances, a selective close structure may be provided at the first opening 220, and the first opening 220 may be closed according to circumstances through the selective close structure. The close structure may be composed of a cover plate and a rotary shaft, the rotary shaft is connected to the enclosure 200, and the cover plate may be rotatably connected to the rotary shaft. The cover plate is rotated, so that the cover plate closes the first opening 220, and when the sound column assembly 100 extends out of the first opening 220, the cover plate may be pushed open. By providing the cover plate, the first opening 220 may be closed, so as to improve the protection capability.

Referring to FIG. 1 and FIG. 2, it can be understood that the sound column assembly 100 includes a sound column body 120 and a sound column housing 110. The sound column body 120 is connected to the sound column housing 110. The drive assembly 300 drive at least one of the sound column housing 110 or the sound column body 120, so that the sound column body 120 or the sound column housing 110 moves.

The drive assembly 300 drives the sound column housing 110, so that when the drive assembly 300 drives the sound column housing 110 to move, the sound column housing 110 can drive the sound column body 120 to move, so that the sound column body 120 and the sound column housing 110 move together and reciprocate between the first position and the second position.

Specifically, the sound column housing 110 is arranged outside the sound column body 120, so that the sound column body 120 can be protected by the sound column housing 110. The sound generating unit of the sound column assembly 100 can be arranged inside the sound column body 120.

Whether a rear cavity space is effectively sealed has a great influence on the low-frequency part of the sound, and the low-frequency part of the sound has a great influence on the sound quality. The further to the left the low-frequency peak is, the more prominent the bass is, and the sound will be subjectively felt to be more pleasant. Generally, as the volume of the rear cavity space continues to increase, the low-frequency peak of its frequency response curve will continue to move to the left, so that the low-frequency characteristics can be improved. However, when there is a leak in the rear cavity space, the low frequency will attenuate, which causes damage to the sound quality. The degree of influence caused by the leakage of the rear cavity space has a certain relationship with the leakage area and position. Generally, the larger the leakage area of the rear cavity space, the greater the low-frequency attenuation, and the leakage area and the attenuation of the low-frequency resonance point are in an approximately linear relationship. Under the condition of the same leakage area, the smaller the rear cavity space, the greater the low-frequency attenuation, that is, the greater the influence caused by the leakage.

Figure 8:
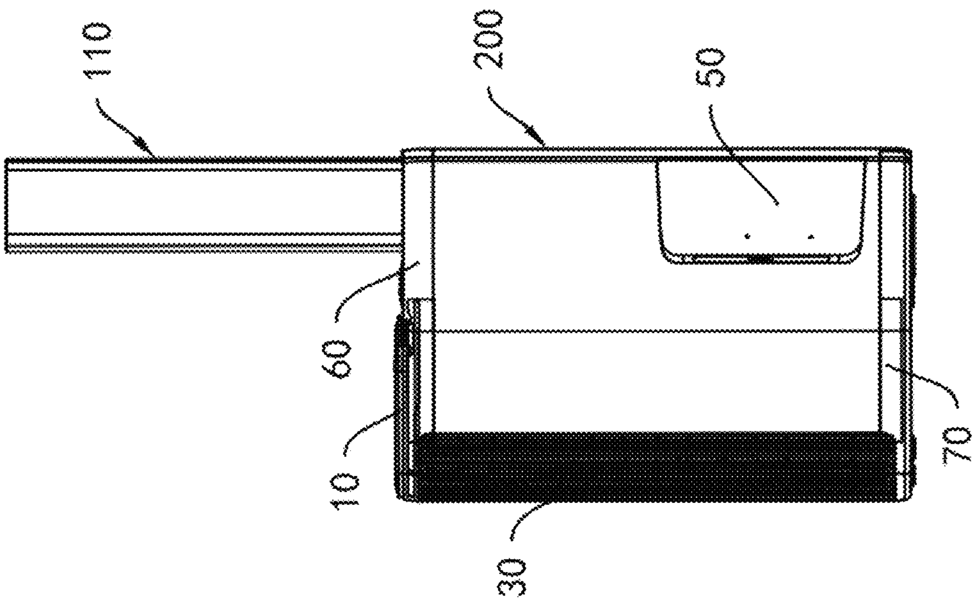
FIG. 8 is a schematic structural diagram of an intelligent audio device provided by an embodiment of the present disclosure with a raised sound column housing of a sound column assembly.
Figure 9:
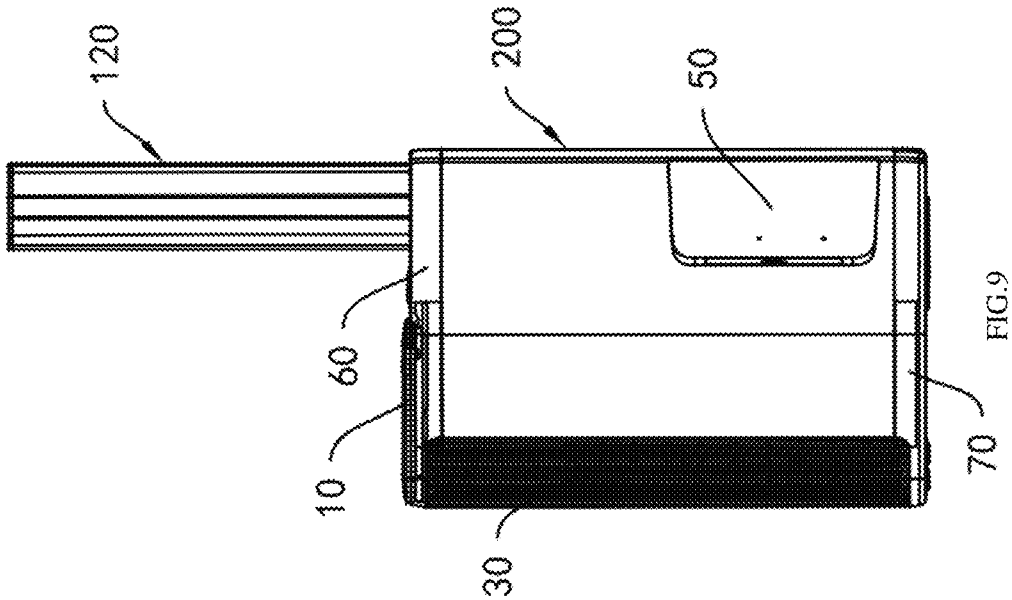
FIG. 9 is a schematic structural diagram of an intelligent audio device provided by an embodiment of the present disclosure with a raised sound column body of a sound column assembly.

Referring to FIG. 8 and FIG. 9, according to specific actual conditions, the drive assembly 300 can drive the sound column housing 110 and the sound column body 120. Specifically, the drive assembly 300 is arranged inside the sound column body 120 and is arranged through the sound column body 120 to connect with the sound column housing 110. The drive assembly 300 pushes the sound column body 120 to rise at first, and then drive the sound column housing 110 to rise. The drive assembly 300 can push the sound column housing 110 to descend at first, and then drive the sound column body 120 to descend.

Referring to FIG. 8 and FIG. 9, it can be understood that, the drive assembly 300 may be provided with a plurality of motors to cooperate with a plurality of screw rods, so as to respectively push the sound column housing 110 and the sound column body 120 up and down, so that the sound column body 120 can be driven by the driving assembly 300 to extend from the first opening 220 to the outside of the first accommodation space 210, while the sound column housing 110 is still located in the first accommodation space 210. The drive assembly 300 can also drive the sound column housing 110 to extend from the first opening 220 to the outside of the first accommodation space 210, while the sound column body 120 is still located in the sound column housing 110.

According to specific actual conditions, the drive assembly 300 can drive the sound column body 120, while the sound column body 120 and the sound column housing 110 are abutting against each other. After the drive assembly 300 drives the sound column body 120 to rise, the sound column housing 110 can be driven to rise together, until the bottom of the sound column housing 110 rises to the first opening. The rising position of the sound column housing 110 is limited by the enclosure 200, and the sound column body 120 continues to rise to its predetermined position. After the drive assembly 300 drives the sound column body 120 to descend, the sound column housing 110 can be driven to descend together, until the sound column housing 110 descends to its predetermined position. The descending position of the sound column housing 110 is limited by the enclosure 200, and the sound column body 120 continues to descend to its predetermined position and in the first accommodation space 210.

Figure 26:
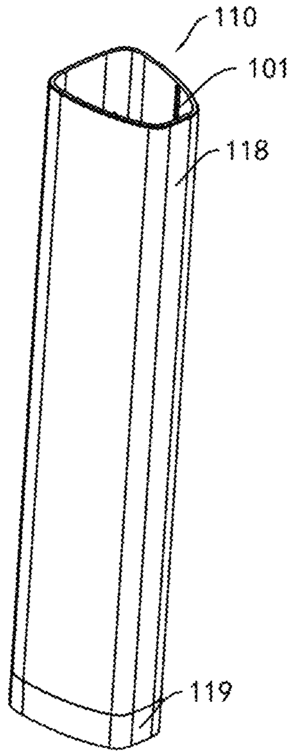
FIG. 26 is a schematic structural diagram of a sound column housing of an intelligent audio device provided by an embodiment of the present disclosure.
Figure 27:
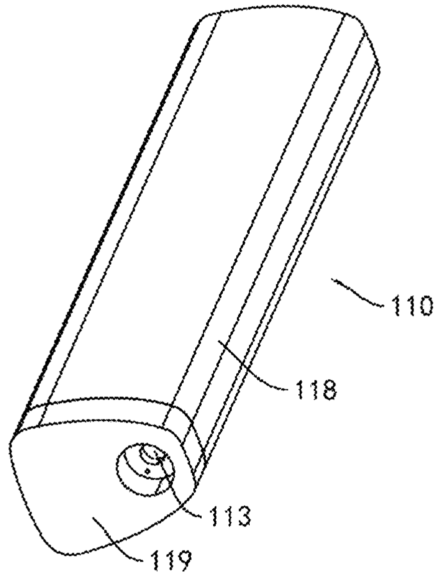
FIG. 27 is a schematic structural diagram of the sound column housing of the intelligent audio device provided by an embodiment of the present disclosure in FIG. 26 from another perspective.
Figure 28:
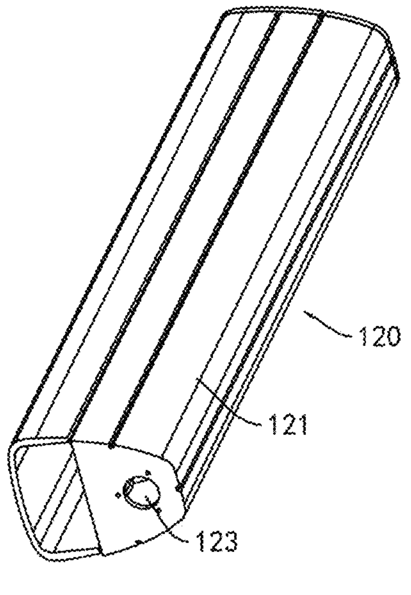
FIG. 28 is a schematic structural diagram of a sound column body of an intelligent audio device provided by an embodiment of the present disclosure.
Figure 29:
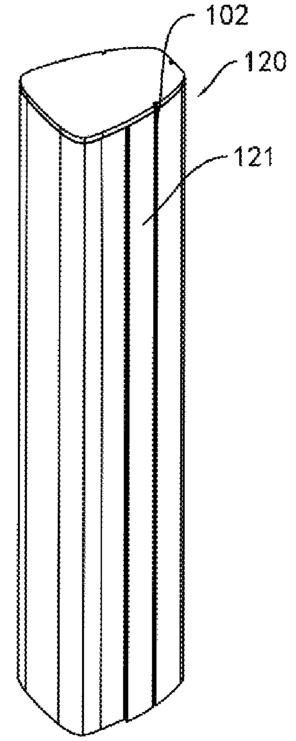
FIG. 29 is a schematic structural diagram of the sound column body of the intelligent audio device provided by an embodiment of the present disclosure in FIG. 28 from another perspective.

Referring to FIG. 26 and FIG. 29, specifically, a slide block 101 may be provided inside the sound column housing 110, and a slide groove 102 may be provided outside the sound column body 120. The slide block 101 is slidably provided in the slide groove 102, and the stability of relative sliding between the sound column housing 110 and the sound column body 120 can be defined. In particular, the slide block 101 can be a rack, so that the sound column body 120 and the sound column housing 110 are closely matched, so as to reduce the gap between them.

Figure 23:
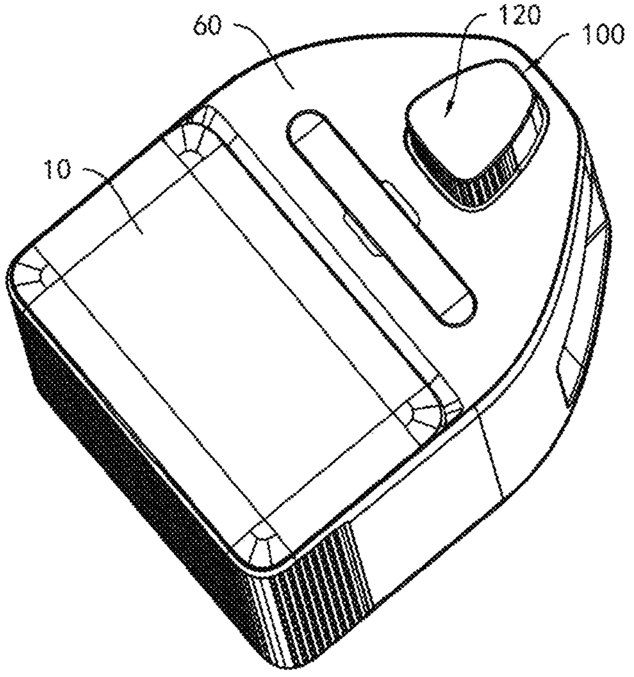
FIG. 23 is a schematic structural diagram of an intelligent audio device provided by an embodiment of the present disclosure with a partially raised sound column body of a sound column assembly.
Figure 24:
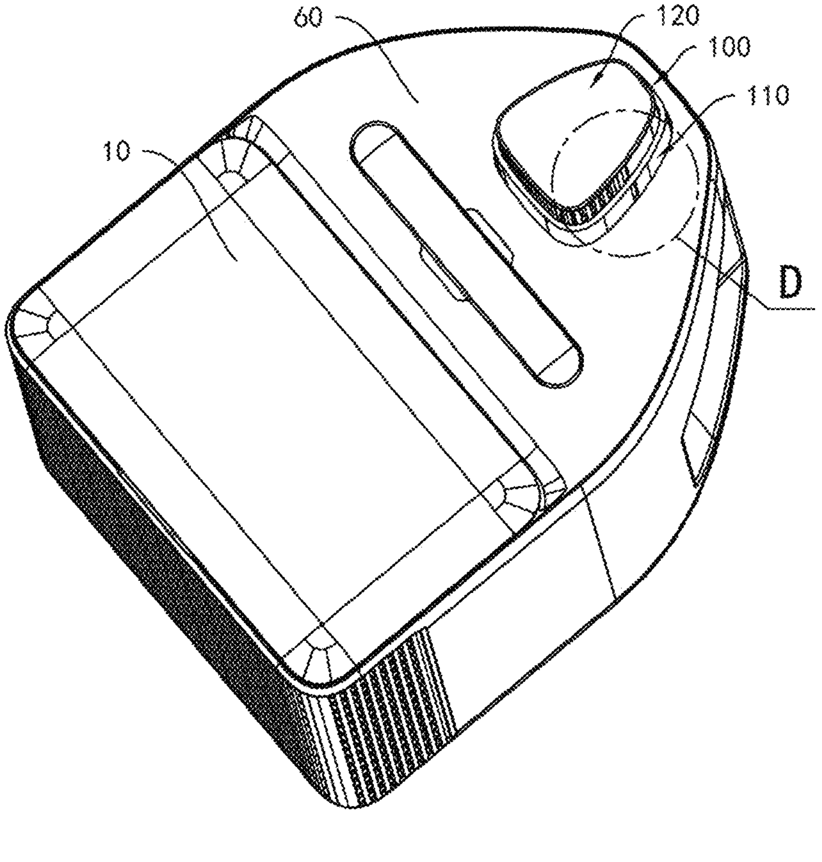
FIG. 24 is a schematic structural diagram of an intelligent audio device provided by an embodiment of the present disclosure with a partially raised sound column housing and a partially raised sound column body of a sound column assembly.
Figure 25:
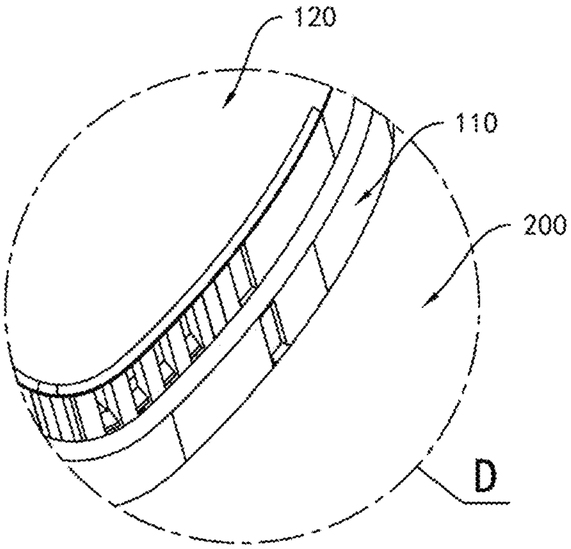
FIG. 25 is an enlarged view of part D of the intelligent audio device provided by an embodiment of the present disclosure in FIG. 24.

Referring to FIG. 23, FIG. 24 and FIG. 25, specifically, the drive assembly 300 can drive the sound column body 120 and the sound column housing 110 to move, so that the sound column housing 110 can be partially moved from the first opening 220 to the outside of the first accommodation space 210, and that the sound column body 120 can be partially moved to the outside of the sound column housing 110, so that the sound column assembly 100 moves to a position between the first position and the second position.

Referring to FIG. 1 and FIG. 2, it can be understood that the sound column housing 110 is arranged to be penetrated through and sleeved outside the sound column body 120. The sound column body 120 is slidably connected to the sound column housing 110 and is able to slide relative to the sound column housing 110 along a first direction. The drive assembly 300 is connected to the sound column body 120 and the sound column housing 110, the drive assembly 300 is able to drive the sound column housing 110 to at least partially move from the first opening 220 outside the first accommodation space 210, and is able to drive the sound column body 120 to at least partially move outside the sound column housing 110.

The sound column housing 110 is sleeved on the sound column body 120, so that the sound column body 120 can be protected by the sound column housing 110. The sound column housing 110 is arranged to be penetrated through along the first direction, and the sound column body 120 slides back and forth along the first direction inside the sound column housing 110. The drive assembly 300 is provided to drive the sound column housing 110 to extend from the first opening 220 to the outside of the first accommodation space 210, so that the sound column assembly 100 extends from the first opening 220, and the drive assembly 300 can drive the sound column body 120 to extend from the inside of the sound column housing 110 to the outside of the sound column housing 110, so that the sound column body 120 can normally perform the sounding work, which avoids the sound column housing 110 blocking the sound emitted by the sound column body 120. The sound quality of the sound column body 120 is ensured.

Specifically, the sound column housing 110 is arranged to be penetrated through to form a first through end and a second through end, the first through end is opposite to the second through end, the sound column body 120 can slide relative to the sound column housing 110 through the first through end and the second through end.

Referring to FIG. 4, FIG. 5, FIG. 10, FIG. 11 and FIG. 12, it can be understood that, the drive assembly 300 includes a drive member 301 and a first screw rod 310. The first screw rod 310 is threadedly connected to the sound column housing 110. The drive member 301 drives the first screw rod 310, so that the first screw rod 310 rotates around a first direction.

Since the first screw rod 310 is threadedly connected to the sound column housing 110, when the drive member 301 drives the first screw rod 310 to rotate around the first direction, the sound column housing 110 can be driven to move along the first direction, so that the sound column housing 110 can be extended from the first opening 220 or retracted into the first accommodation space 210.

Specifically, the shape of the first opening 220 is non-circular, and the cross-section of the sound column housing 110 is also non-circular. An outer wall of the sound column housing 110 abuts against the inner wall of the first opening 220, so as to prevent the sound column housing 110 from rotating in the first accommodation space 210.

Specifically, the cross-section of the first accommodation space 210 is non-circular, and the cross-section of the sound column housing 110 is also non-circular. The outer wall of the sound column housing 110 abuts against the inner wall of the first accommodation space 210, so as to prevent the sound column housing 110 from rotating in the first accommodation space 210.

Specifically, after the drive assembly 300 drives the sound column housing 110 to rise, the sound column body 120 can be driven to rise together, and the bottom of the sound column body 120 can be raised to the first opening 220, so as to reduce the height of the sound column assembly 100 to adapt to the surrounding environment.

Referring to FIG. 4, FIG. 5, FIG. 10, FIG. 11 and FIG. 12, it can be understood that, the drive assembly 300 further includes a second screw rod 320. The drive member 301 drives the second screw rod 320, so that the second screw rod 320 is able to rotate; the second screw rod 320 is threadedly connected to the sound column body 120.

Since the second screw rod 320 is threadedly connected to the sound column body 120, when the drive member 301 drives the second screw rod 320 to rotate around the first direction, the sound column body 120 can be driven to move along the first direction, so that the sound column body 120 can be extended from the sound column housing 110 or retracted into the sound column housing 110.

Specifically, the cross-section of the sound column housing 110 is non-circular, and the cross-section of the sound column body 120 is also non-circular, and the outer wall of the sound column body 120 abuts against the inner wall of the sound column housing 110, so as to prevent the sound column body 120 from rotating in the sound column housing 110.

Specifically, the drive member 301 can drive a rotary motor.

Referring to FIG. 4, FIG. 5, FIG. 17, FIG. 18 and FIG. 19, it can be understood that the second screw rod 320 is rotatably connected to the sound column housing 110. The second screw rod 320 is arranged to be penetrated through, the second screw rod 320 is slidably sleeved on the first screw rod 310. At least one of the first screw rod 310 or the second screw rod 320 is configured with a chute 302, at least another one of the second screw rod 320 or the first screw rod 310 is configured with a slider 303. The slider 303 is slidably arranged in the chute 302. An extension direction of the chute 302 is arranged in the same direction as an axial direction of the first screw rod 310.

The second screw rod 320 is arranged to be penetrated through and sleeved outside the first screw rod 310. at least one of the first screw rod 310 and the second screw rod 320 is provided with a chute 302, and the other one of the first screw rod 310 and the second screw rod 320 is provided with a slider 303. The slider 303 is slidably arranged in the chute 302, so that the first screw rod 310 and the second screw rod 320 can rotate synchronously. The drive member 301 drives the first screw rod 310 to rotate, which can drive the second screw rod 320 to rotate, and the first screw rod 310 and the second screw rod 320 can slide relative to each other along the first direction.

It can be understood that, according to the specific actual situation, the first screw rod 310 and the second screw rod 320 are respectively configured with at least one chute 302 and at least one slider 303, and the chute of the first screw rod 310 cooperates with the slider of the first screw rod 310, and the slider of the first screw rod 310 cooperates with the chute of the first screw rod 310, so as to further improve the stability of the relative sliding of the first screw rod 310 and the second screw rod 320.

Figure 5:
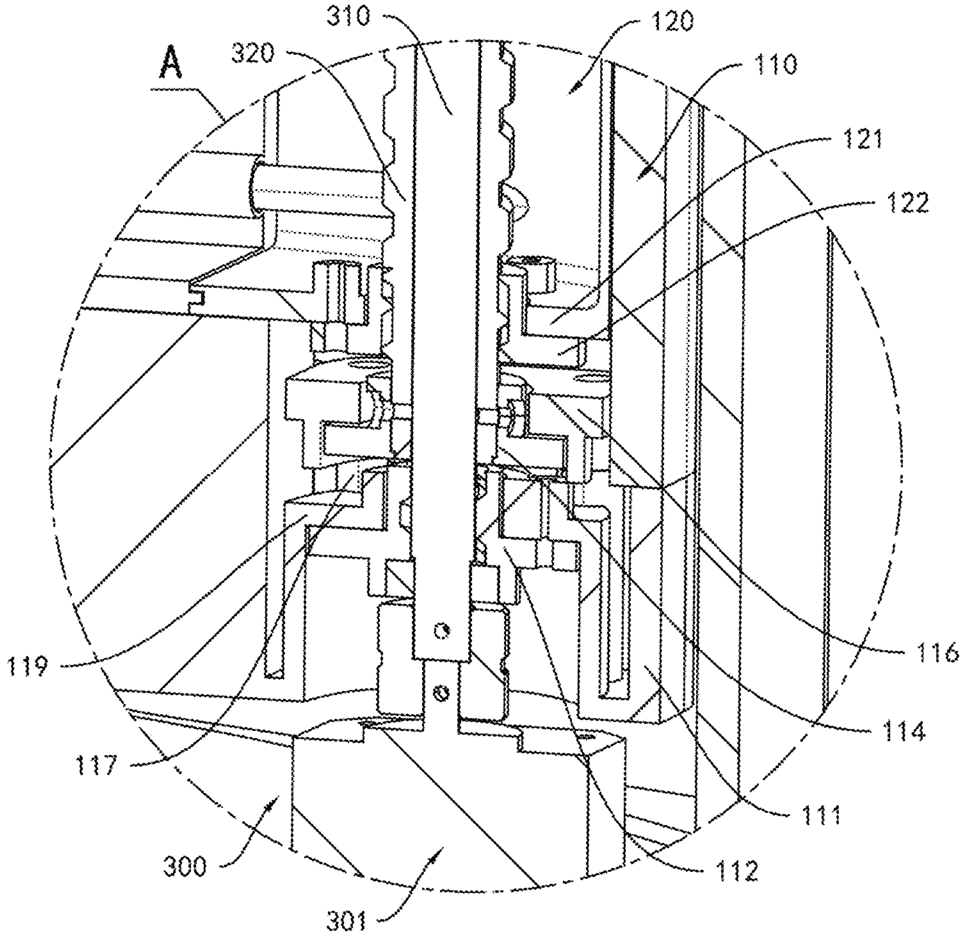
FIG. 5 is an enlarged view of part A of the intelligent audio device provided by an embodiment of the present disclosure in FIG. 4.
Figure 12:
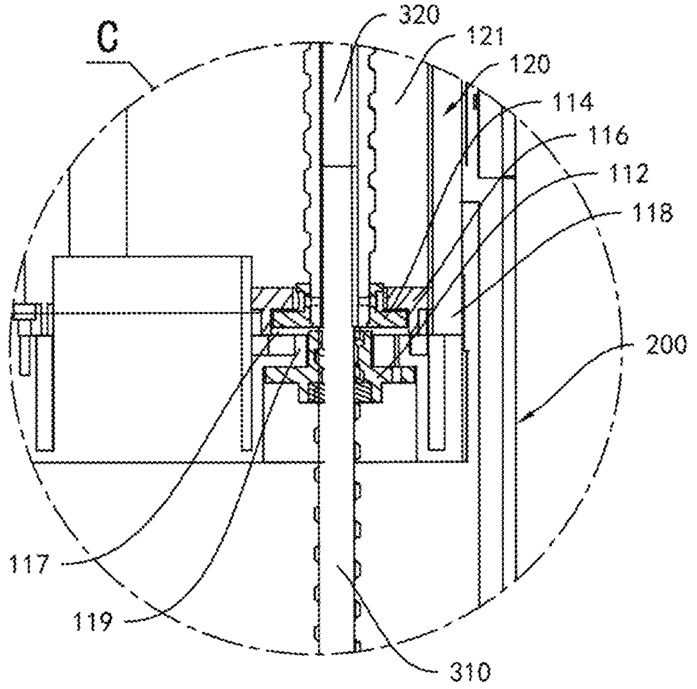
FIG. 12 is an enlarged view of part C of the intelligent audio device provided by an embodiment of the present disclosure in FIG. 10.
Figure 13:
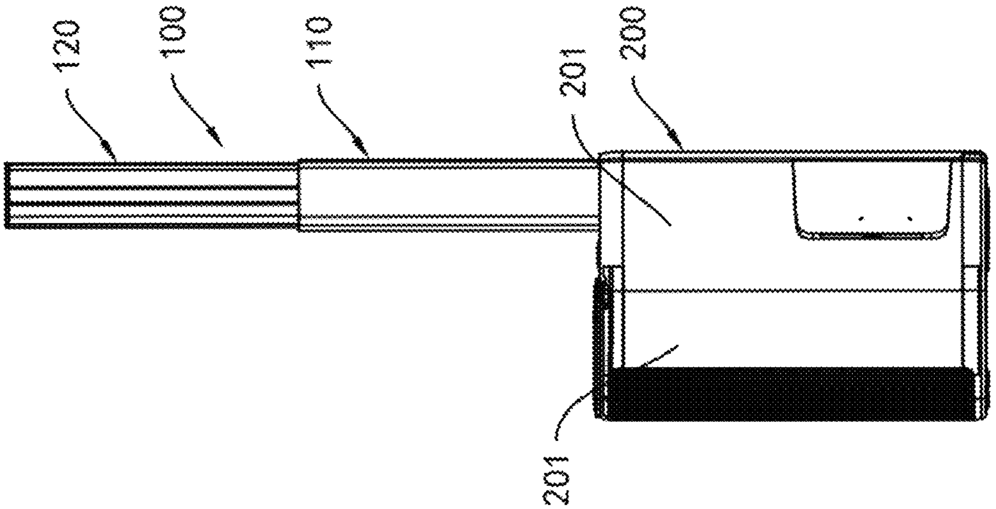
FIG. 13 is a side view of an intelligent audio device provided by an embodiment of the present disclosure with a sound column assembly in a second position.
Figure 14:
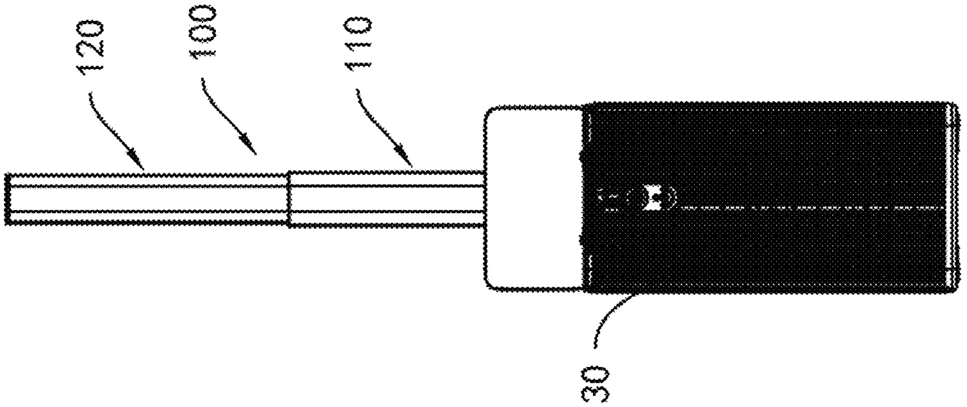
FIG. 14 is a front view of an intelligent audio device provided by an embodiment of the present disclosure with a sound column assembly in a second position.

Referring to FIG. 2, FIG. 5 and FIG. 12, specifically, the drive member 301 drives the first screw rod 310 to rotate, so that the sound column housing 110 can move in the first direction. Since the second screw rod 320 is rotatably connected to the sound column housing 110, the sound column housing 110 can drive the second screw rod 320 to move in the first direction. When the drive member 301 drives the first screw rod 310 to rotate, it can drive the second screw rod 320 to rotate, so that the sound column body 120 also moves in the first direction. Therefore, when the drive member 301 drives the first screw rod 310 to rotate, the sound column housing 110 can move in the first direction relative to the enclosure 200, so that the sound column housing 110 extends from the first opening 220, and the sound column body 120 can move in the first direction relative to the sound column housing 110, so that the sound column body 120 extends from the inside of the sound column housing 110 to the outside of the sound column housing 110.

Referring to FIG. 8 and FIG. 9, specifically, when the sound column housing 110 extends from the first opening 220 and the sound column body 120 extends from the inside of the sound column housing 110 to the outside of the sound column housing 110, the sound column housing 110 and the sound column body 120 are both located outside the first accommodation space 210, the sound column assembly 100 achieves two-stage lifting, and the sound column assembly 100 is in the second position at this time.

Figure 6:
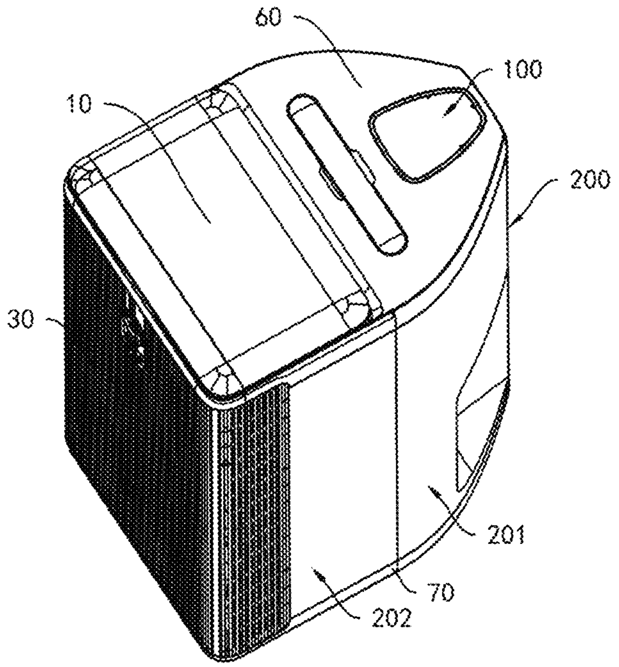
FIG. 6 is a schematic structural diagram of an intelligent audio device provided by an embodiment of the present disclosure from another perspective.
Figure 7:
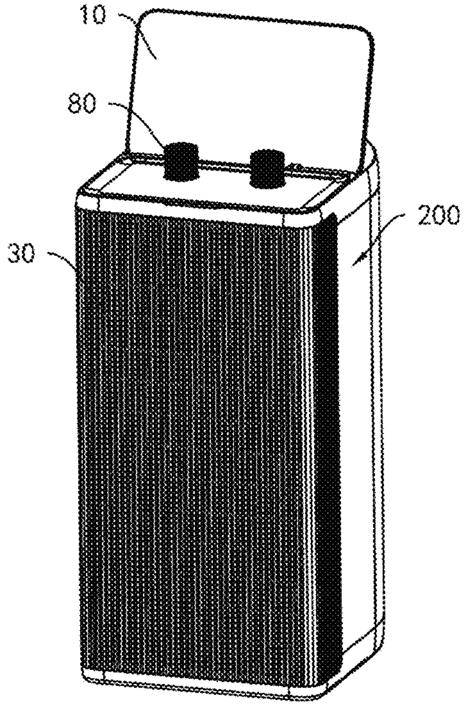
FIG. 7 is a schematic structural diagram of an intelligent audio device provided by an embodiment of the present disclosure with an open screen and a raised microphone.

Referring to FIG. 6, specifically, when the sound column housing 110 extends from the first opening 220 into the first accommodation space 210, and the sound column body 120 extends out of the sound column housing 110, the sound column housing 110 and the sound column body 120 are both located in the first accommodation space 210, the sound column assembly 100 realizes two-stage lifting, and the sound column assembly 100 is in the first position at this time.

Figure 17:
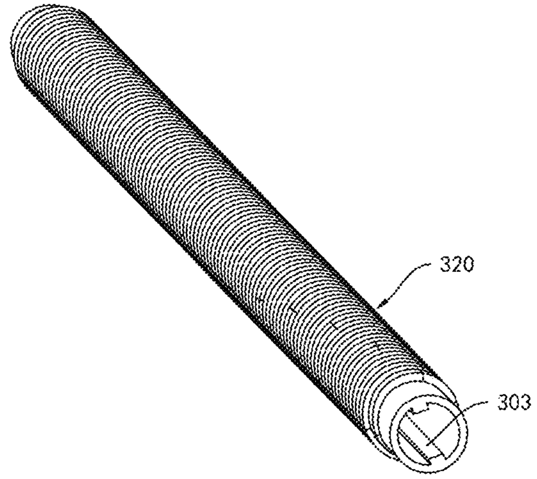
FIG. 17 is a schematic structural diagram of a second screw rod of an intelligent audio device provided by an embodiment of the present disclosure.
Figure 18:
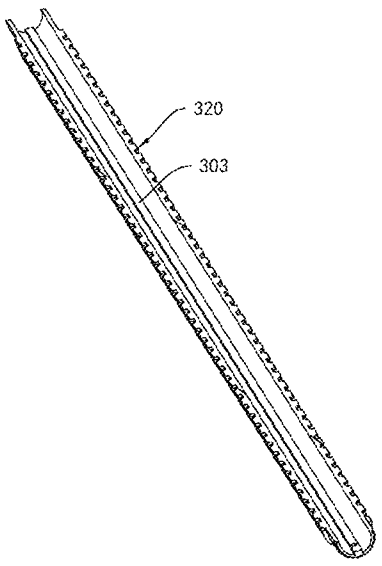
FIG. 18 is a sectional view of a second screw rod of an intelligent audio device provided by an embodiment of the present disclosure.
Figure 19:
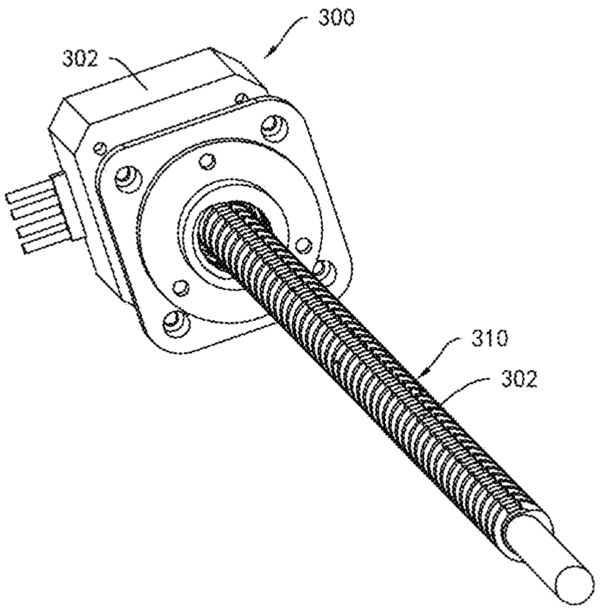
FIG. 19 is a schematic structural diagram of a drive assembly and a first screw rod of an intelligent audio device provided by an embodiment of the present disclosure.

Referring to FIG. 17, FIG. 18 and FIG. 19, specifically, a slider 303 is provided on the inner wall of the first screw rod 310, and a chute 302 is provided on the outer wall of the second screw rod 320, and the slider 303 is slidably provided in the chute 302. The chute 302 is provided through, so that the second screw rod 320 can be inserted into the first screw rod 310.

It can be understood that, according to the specific actual situation, a chute 302 is provided on the inner wall of the first screw rod 310, and a slider 303 is provided on the outer wall of the second screw rod 320. In other cases, a slider 303 and a chute 302 are provided on the inner wall of the first screw rod 310, and at the same time, a slider 303 and a chute 302 are also provided on the outer wall of the second screw rod 320. The slider 303 on the inner wall of the first screw rod 310 is slidably arranged in the chute 302 on the outer wall of the second screw rod 320, and the slider 303 on the outer wall of the second screw rod 320 is slidably arranged in the chute 302 on the inner wall of the first screw rod 310 to improve the stability of the connection.

Referring to FIG. 17, in particular, a plurality of sliders 303 can be provided, a plurality of chutes 302 can be correspondingly provided. The plurality of sliders 303 may be respectively slidably provided in the plurality of chutes 302, so as to further improve the stability of the connection, and improve the stability of the relative sliding of the first screw rod 310 and the second screw rod 320, and improve the stability of the synchronous rotation of the first screw rod 310 and the second screw rod 320.

Since the sound column assembly 100 is in the first accommodation space 210 with a higher height, the height of the sound column assembly 100 itself can also be higher, and the sound column assembly 100 can also be raised higher. Referring to FIG. 30 to FIG. 35, it can be understood that, the drive assembly 300 includes a third screw rod and a drive member 301, the drive member 301 drives the third screw rod. The sound column assembly 100 includes a sound column body 120 and a sound column housing 110, the sound column body 120 is connected to the sound column housing 110, the third screw rod is threadedly connected to at least one of the sound column housing 110 or the sound column body 120, the drive member 301 drives the third screw rod to rotate, so as to drive the sound column housing 110 and the sound column body 120 to reciprocate, or, the sound column assembly 100 includes a sound column body 120, the third screw rod is threadedly connected to the sound column body 120, the drive member 301 drives the third screw rod to rotate, so as to drive the sound column body 120 to reciprocate.

Figure 30:
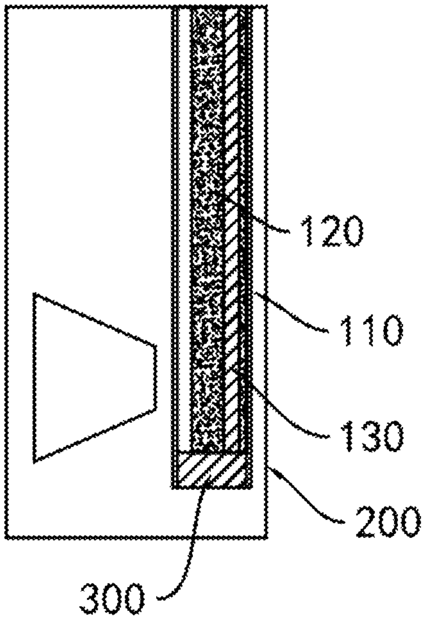
FIG. 30 is a sectional view of a drive assembly of an intelligent audio device provided by an embodiment of the present disclosure with a third screw rod connected with a sound column body.
Figure 31:
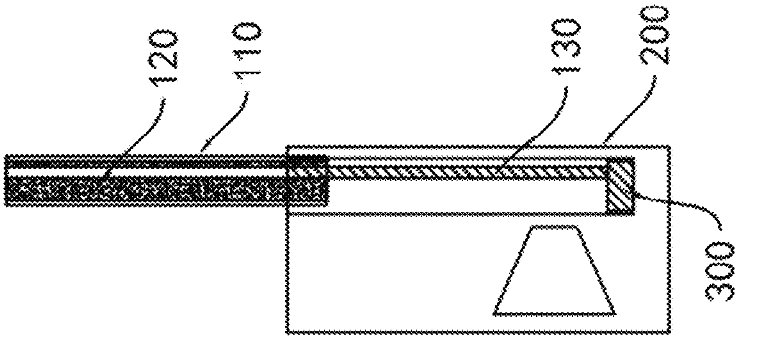
FIG. 31 is another sectional view of the drive assembly of the intelligent audio device provided by an embodiment of the present disclosure in FIG. 30 with a third screw rod connected with a sound column body and a sound column housing.

Referring to FIG. 30 and FIG. 31, specifically, the sound column body 120 is connected to the sound column housing 110, the third screw rod can penetrate the sound column body 120 and the sound column housing 110, and is threadedly connected to the sound column body 120. The drive member 301 drives the third screw rod to rotate, so as to drive the sound column body 120 and the sound column housing 110 to reciprocate simultaneously. After the sound column housing 110 moves, the sound column housing 120 also moves synchronously, so as to be able to expand the acoustic volume of the sound column assembly 100.

Figure 32:
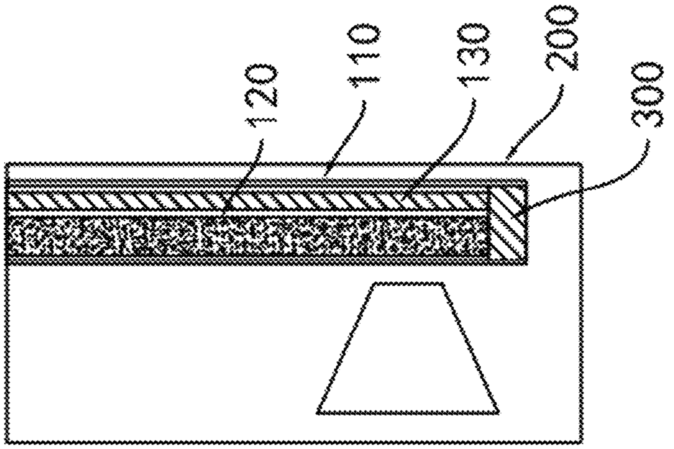
FIG. 32 is a sectional view of a drive assembly of an intelligent audio device provided by an embodiment of the present disclosure with a third screw rod connected with a sound column housing.
Figure 33:
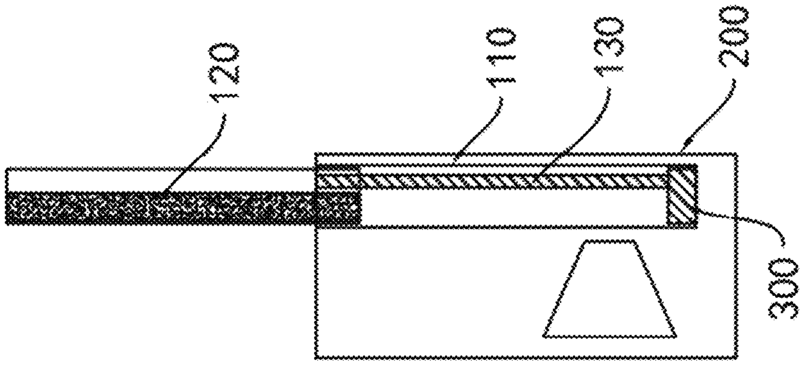
FIG. 33 is another sectional view of the drive assembly of the intelligent audio device provided by an embodiment of the present disclosure in FIG. 32 with a third screw rod connected with a sound column housing.

Referring to FIG. 32 and FIG. 33, specifically, the sound column body 120 is connected to the sound column housing 110, the third screw rod can penetrate the sound column housing 110 and be threadedly connected to the sound column body 120. The drive member 301 drives the third screw rod to rotate to drive the sound column body 120 to reciprocate, so as to drive the sound column body 120 to reciprocate. By providing the sound column housing 110, the sound column body 120 can be protected, and the tightness of the rear cavity space can be improved.

Figure 34:
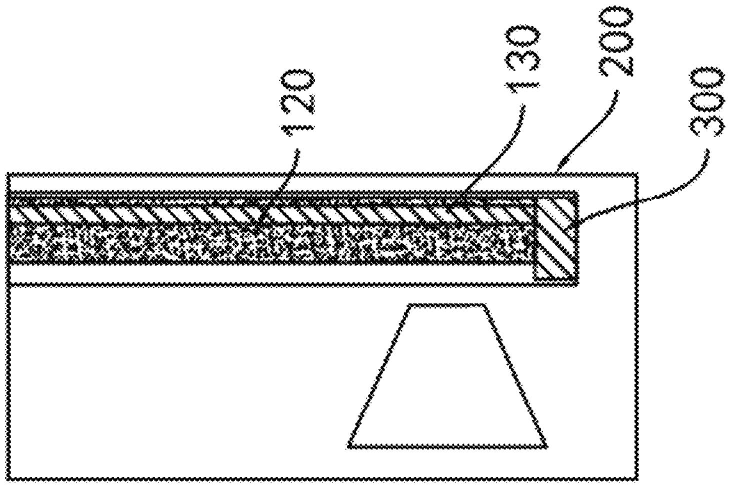
FIG. 34 is a sectional view of a drive assembly of an intelligent audio device provided by an embodiment of the present disclosure with a third screw rod connected with a sound column body.
Figure 35:
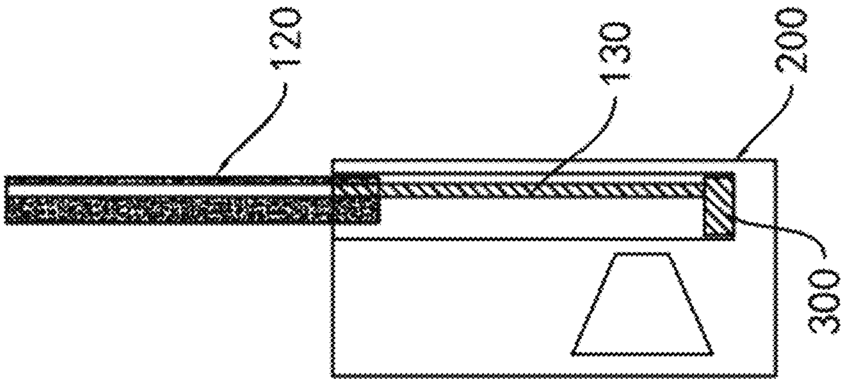
FIG. 35 is another sectional view of the drive assembly of the intelligent audio device provided by an embodiment of the present disclosure in FIG. 33 with a third screw rod connected with a sound column body.
Figure 36:
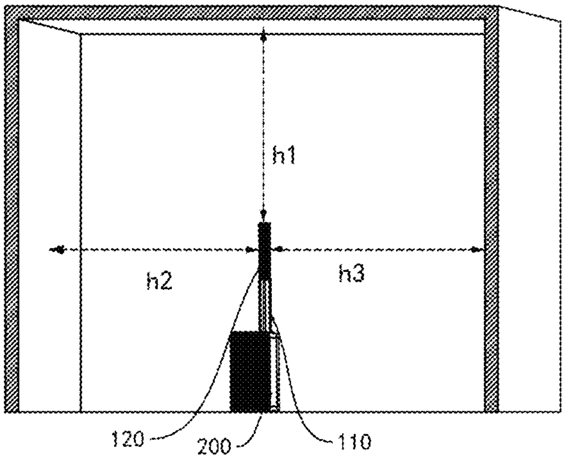
FIG. 36 is a schematic structural diagram of an intelligent audio device provided by an embodiment of the present disclosure in a room.
Figure 37:
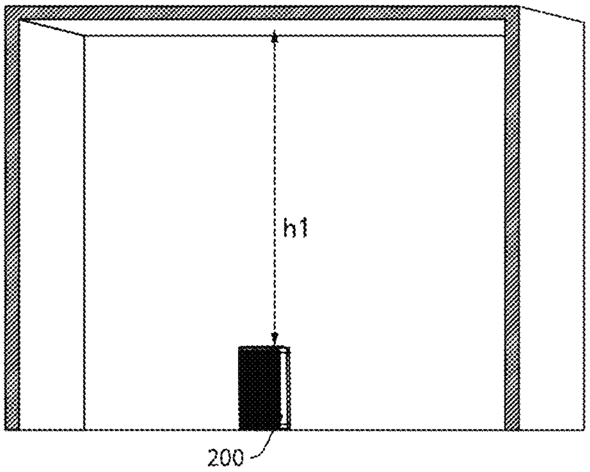
FIG. 37 is another schematic structural diagram of an intelligent audio device provided by an embodiment of the present disclosure in a room.
Figure 38:
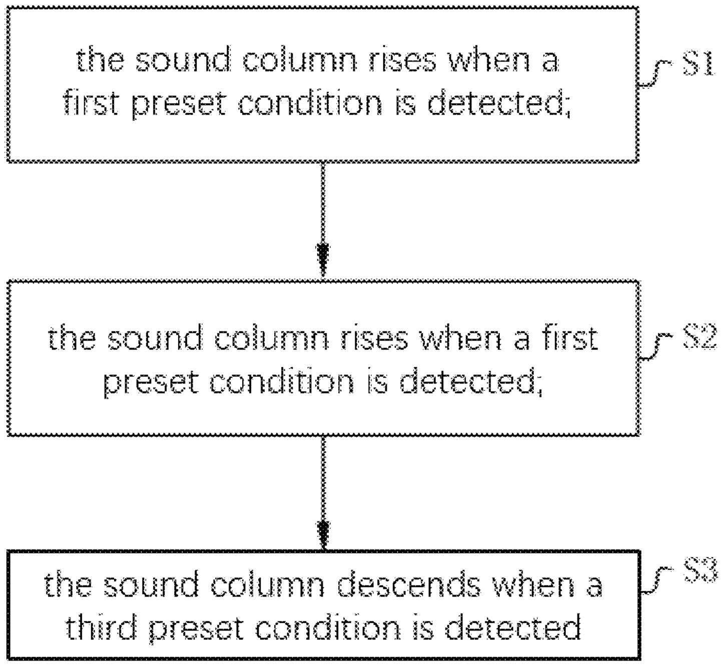
FIG. 38 is a flow chart of a method for controlling automatic lifting of a sound column provided by an embodiment of the present disclosure.

Referring to FIG. 34 and FIG. 35, specifically, the third screw rod can penetrate the sound column body 120 and be threadedly connected with the sound column body 120, and the drive member 301 drives the third screw rod to rotate to drive the sound column body 120 and the sound column housing 110 to reciprocate simultaneously. On this basis, the configuration of the sound column housing 110 is cancelled to simplify the structure of the sound column assembly 100 and reduce the weight of the sound column assembly 100.

Referring to FIG. 5 and FIG. 12, it can be understood that, the sound column housing 110 includes a first main body 111 and a first nut 112. The first nut 112 is fixedly connected to the first main body 111 and is threadedly connected to the first screw rod 310. The sound column body 120 includes a second main body 121 and a second nut 122. The second nut 122 is fixedly connected to the second main body 121 and is threadedly connected to the second screw rod 320. The first nut and the second nut might be for example cylinder nuts or ball nuts.

The first nut 112 is fixedly connected to the first main body 111 to prevent the first nut 112 from rotating synchronously with the first screw rod 310, so as to improve the stability of the transmission. The second nut 122 is fixedly connected to the second main body 121 to prevent the first nut 112 from rotating synchronously with the first screw rod 310, so as to improve the stability of the transmission.

Specifically, the first nut 112 can be arranged outside the first main body 111 to prevent the first screw rod 310 from affecting the sound-emitting element inside the first main body 111. The first nut 112 can also be arranged inside the first main body 111 to save the space occupied by the sound column assembly 100. The second nut 122 can be arranged outside the second main body 121 to prevent the second screw rod 320 from affecting the sound-emitting element inside the second main body 121. The second nut 122 can also be arranged inside the second main body 121 to save the space occupied by the sound column assembly 100.

Referring to FIG. 11, FIG. 12, FIG. 27 and FIG. 28, it can be understood that, the first main body 111 is configured with a first through opening 113, and the second main body 121 is configured with a second through opening 123. The first through opening 113 and the second through opening 123 are arranged opposite to each other. The first nut 112 is arranged at the first through opening 113. The second nut 122 is arranged at the second through opening 123. The first screw rod 310 is arranged through the first through opening 113, and the first screw rod 310 is at least partially located in the first main body 111. The second screw rod 320 is arranged through the second through opening 123, and the second screw rod 320 is at least partially located in the second main body 121.

The first through opening 113 and the second through opening 123 are arranged opposite to each other in the first direction. The first nut 112 is arranged at the first through opening 113 and the second nut 122 is arranged at the second through opening 123, so that the first screw rod 310 is sequentially passed through the first through opening 113 and the second through opening 123. The first screw rod 310 is at least partially located in the sound column body 120 and the sound column housing 110, so as to reduce the space occupied by the first screw rod 310 and limit the movement direction of the sound column body 120 and the sound column housing 110. The second screw rod 320 is sleeved outside the first screw rod 310. The second screw rod 320 is arranged through the second opening, and the second screw rod 320 is at least partially located in the sound column body 120, so as to reduce the space occupied by the second screw rod 320 and limit the movement direction of the sound column body 120 and the sound column housing 110.

Specifically, axial directions of the first screw rod 310 and the second screw rod 320 are arranged in the same direction. The second screw rod 320 is located in the sound column housing 110, so that the second screw rod 320 can be protected by the sound column housing 110.

Referring to FIG. 3 and FIG. 4, it can be understood that, the sound column housing 110 includes a first main body

111, a connect member 114 and a limit member 116. The connect member 114 is connected to the second screw rod 320, the limit member 116 is connected to the first main body 111, and a placement cavity 117 is defined between the limit member 116 and the first main body 111. The connect member 114 is rotatably arranged in the placement cavity 117.

A placement cavity 117 is defined and formed between the limit member 116 and the first main body 111. The placement cavity 117 can limit member the position of the connect member 114. Since the connect member 114 is connected to the second screw rod 320, the position of the second screw rod 320 can be limited. In particular, when the second screw rod 320 is driven by the first screw rod 310 and rotates, the connect member 114 can also rotate in the placement cavity 117.

When the sound column housing 110 moves along the first direction, since the connect member 114 can abut against the inner wall of the placement cavity 117 along the first direction, the inner wall of the placement cavity 117 can abut against the connect member 114, so that the second screw rod 320 can be pushed to move relative to the first screw rod 310, so that the second screw rod 320 is driven to move when the sound column housing 110 moves, and since the second screw rod 320 is threadedly connected to the sound column body 120, the second screw rod 320 can drive the sound column body 120 to move along the first direction. A gap can be configured between the connect member 114 and the inner wall of the placement cavity 117, and the connect member 114 and the inner wall of the placement cavity 117 can directly abut or indirectly abut. In particular, a filler can be placed in the gap configured between the connect member 114 and the inner wall of the placement cavity 117 to achieve indirect abutment.

Specifically, the drive member 301 drives the first screw rod 310 to rotate, so that the sound column housing 110 can move in the first direction, and the inner wall of the placement cavity 117 formed by the first main body 111 of the sound column housing 110 and the limit member 116 abuts against the connect member 114, so as to drive the second screw rod 320 connected to the connect member 114 to move in the first direction, and drive the sound column body 120 to move, so that the sound column housing 110 and the sound column body 120 are simultaneously extended from the first opening 220 to the outside of the first accommodation space 210. The drive member 301 drives the first screw rod 310 to rotate, so that the second screw rod 320 is driven to rotate, and the sound column body 120 move relative to the sound column housing 110 in the first direction, so that the sound column body 120 is extended from the inside of the sound column housing 110 to the outside of the sound column housing 110.

Specifically, the second main body 121 includes a housing main body 118 and a base 119. The housing main body 118 is arranged to be penetrated through, and the sound column body can penetrate the housing main body 118 and be movably along the first direction. The base 119 is arranged at one end of the housing main body 118, and the first through opening 113 is arranged on the base 119.

Referring to FIG. 3 and FIG. 4, it can be understood that, the enclosure 200 is further configured with a second accommodation space 230. The second accommodation space 230 is communicated with the first accommodation space 210, or the second accommodation space 230 is separated from the first accommodation space 210.

The second accommodation space 230 is configured for electronic components, such as a microphone.

The second accommodation space 230 may be separated from the first accommodation space 210 to prevent the electronic components in the second accommodation space 230 from affecting the sound column assembly 100.

It can be understood that, according to the specific actual situation, the second accommodation space 230 is communicated with the first accommodation space 210, and the drive assembly 300 can be placed in the second accommodation space 230 to reduce the size of the space occupied in the first accommodation space 210.

Figure 10:
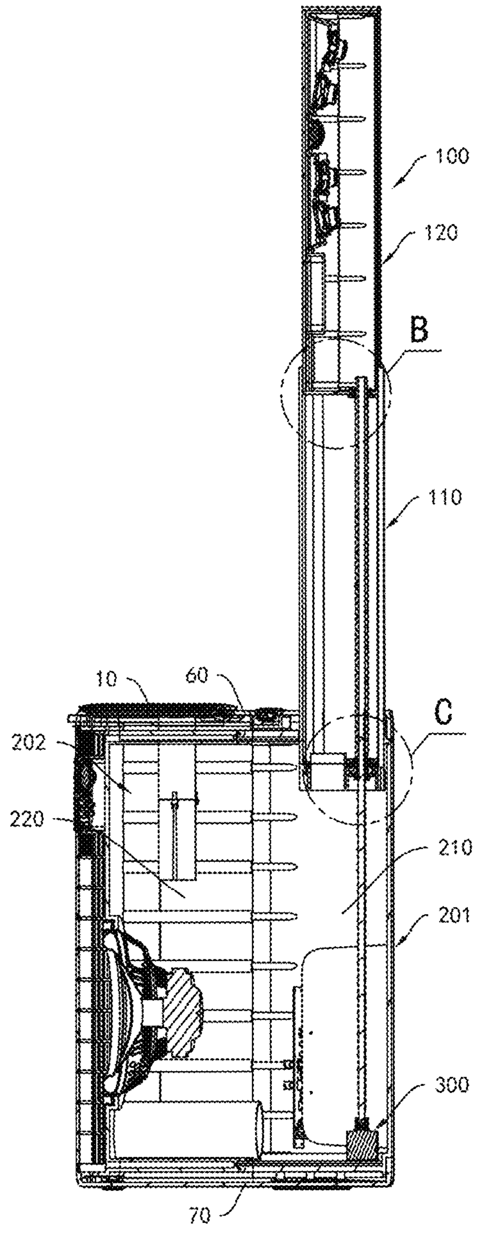
FIG. 10 is a schematic sectional diagram of an intelligent audio device provided by an embodiment of the present disclosure with a sound column assembly in a second position.
Figure 11:
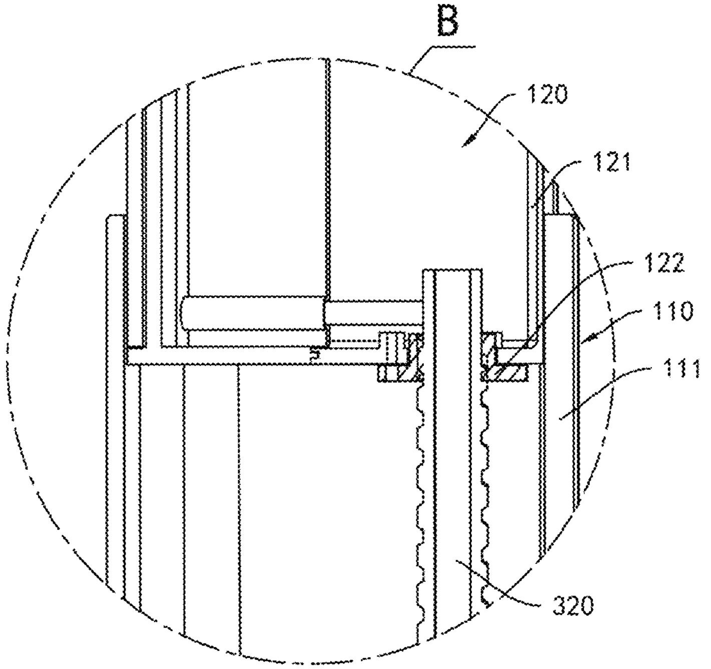
FIG. 11 is an enlarged view of part B of the intelligent audio device provided by an embodiment of the present disclosure in FIG. 10.

Referring to FIG. 10, it can be understood that, the second accommodation space 230 is communicated with the first accommodation space 210. One end of the sound column housing 110 is connected to the sound column body 120. When the sound column body 120 is located in the second position, one end of the sound column housing 110 away from the sound column body 120 is located between the sound column body 120 and the enclosure 200.

After the sound column assembly 100 is raised, the sound column body 120 is located at the second position and outside the first accommodation space 210. A rear cavity space is defined between the enclosure 200 and one end of the sound column housing 110 away from the sound column body 120, and the enclosure 200 closes the bottom of the sound column assembly 100, which not only ensures the stability of the air pressure inside the enclosure 200, but also expands the volume of the rear cavity space. A low-frequency loudspeaker is also arranged in the first accommodation space 210. The enclosure 200 remains in a sealed state to prevent low-frequency attenuation, and the expansion of the volume of the rear cavity space can make the low-frequency peak farther to the left, the bass is more prominent, which improves the sound quality. In addition, in order to ensure the tightness of the rear cavity space, fillers such as EVA, silicone, etc. can be arranged between the enclosure 200 and the sound column housing 110, and between the sound column housing 110 and the sound column body 120 to improve the tightness of the rear cavity space and reduce the degree of leakage of the rear cavity space. In particular, the second accommodation space 230 is communicated with the first accommodation space 210, so that the second accommodation space 230 and the first accommodation space 210 can both be configured as the rear cavity space, so as to further increase the volume of the rear cavity space.

Specifically, after the drive assembly 300 drives the sound column housing 110 to move upward, the rear cavity space is defined and formed between the enclosure 200 and one end of the sound column housing 110 away from the sound column body 120. It can be understood that, the rear cavity space can also exist by itself without the drive assembly 300 driving the sound column housing 110 to move upward.

Referring to FIG. 3, specifically, the enclosure 200 is composed of a first housing 201 and a second housing 202, wherein the first accommodation space 210 is configured in the first housing 201, the first opening 220 is configured on the first housing 201, and the second accommodation space 230 is configured in the second housing 202.

It is well known that, according to specific actual conditions, the first accommodation space 210 is configured in the first housing 201, the first opening 220 is configured on the first housing 201, and the first housing 201 and the second housing 202 define the second accommodation space 230 together.

Specifically, the loudspeaker assembly 40 of the first cavity may be one or more of a low-frequency loudspeaker, a low-frequency loudspeaker and a high-frequency loudspeaker, a low-frequency loudspeaker and a full-range loudspeaker, a low-frequency loudspeaker, a high-frequency loudspeaker and a full-range loudspeaker.

It can be understood that a screen assembly is also included, and the screen assembly includes a screen. The screen is movably connected to the enclosure 200 to improve the convenience of using the screen, and the functionality of the use of the intelligent audio device can be improved by providing the screen.

In particular, the screen 10 is installed outside the enclosure 200 through a hinge structure, and can also be installed outside the top housing 60 or the bottom housing 70.

Referring to FIG. 2, specifically, the microphone, the microphone storage structure, the low-frequency loudspeaker and the screen assembly can be arranged on the same side of the enclosure 200, while the sound column assembly 100 is arranged on the other side, so as to balance the mass on the enclosure 200 and reduce the possibility of the intelligent audio device tipping over after the sound column assembly 100 is raised. In particular, the microphone, the microphone storage structure, the low-frequency loudspeaker and the screen assembly can all be arranged on the front side of the enclosure 200, while the sound column assembly 100 is arranged on the rear side.

Figure 15:
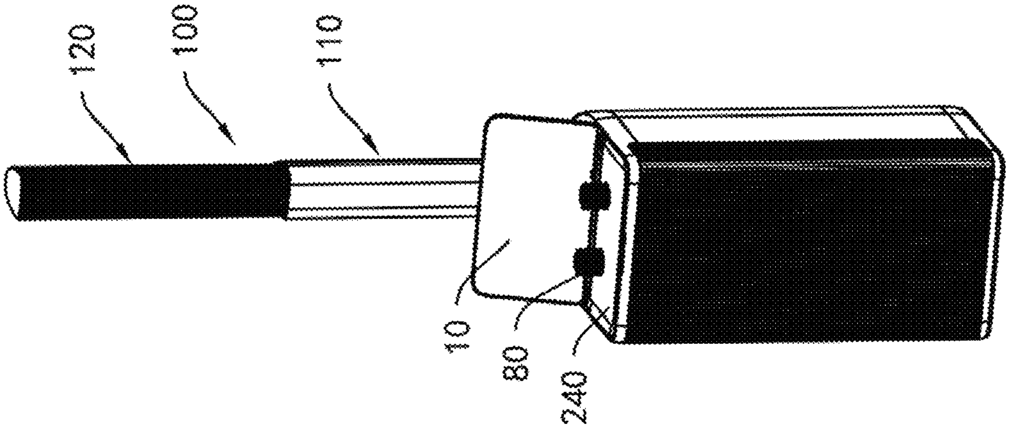
FIG. 15 is a schematic structural diagram of an intelligent audio device provided by an embodiment of the present disclosure with an open screen in a second mount position and a raised microphone.
Figure 16:
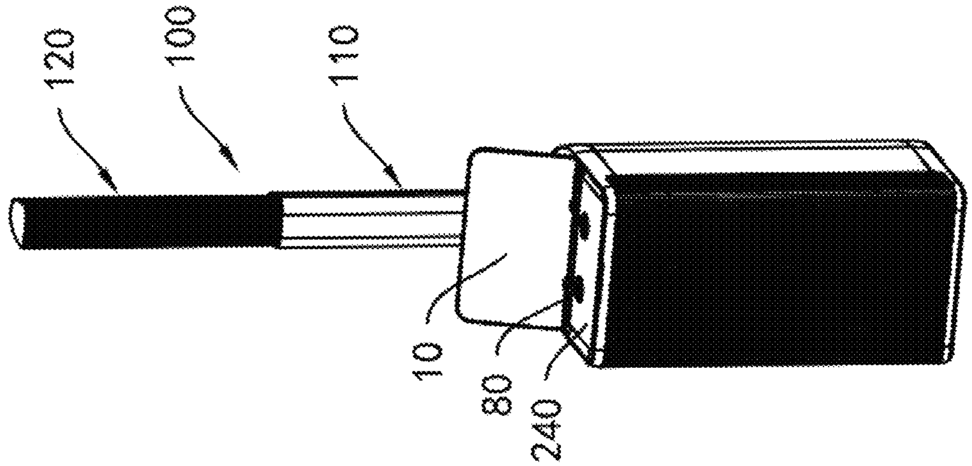
FIG. 16 is a schematic structural diagram of an intelligent audio device provided by an embodiment of the present disclosure with an open screen in a second mount position and an accommodated microphone.

Referring to FIG. 1, FIG. 15 and FIG. 16, it can be understood that, the enclosure is provided with a storage area 240, and the storage area 240 is configured to store the screen.

The screen can be moved into the storage area 240, and the storage area 240 can accommodate the screen. In particular, the storage area 240 is arranged on the outer end wall of the enclosure 200.

It can be understood that, the screen assembly also includes a movable connection member; the storage area 240 and the first opening 220 are both located on an end surface of the enclosure 200, the storage area 240 is located on one side of the first opening 220, and the movable connection member is arranged at a first mount position or a second mount position of the storage area 240; the second mount position is located away from the first opening 220 relative to the first mount position and is spaced apart from the first mount position.

Figure 20:
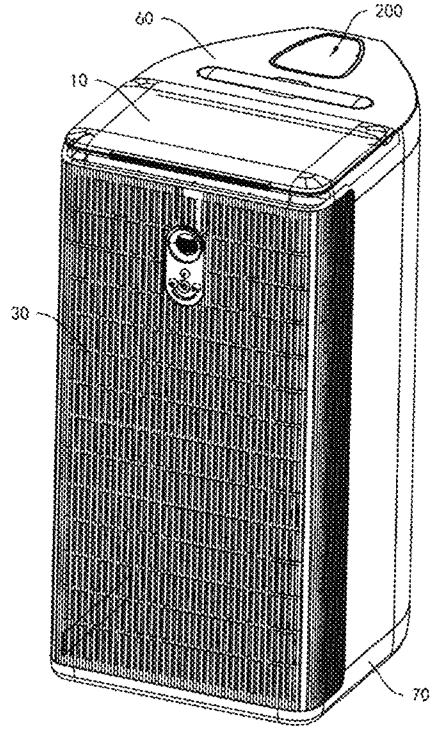
FIG. 20 is a schematic structural diagram of the intelligent audio device provided by an embodiment of the present disclosure in FIG. 1 from another perspective.
Figure 21:
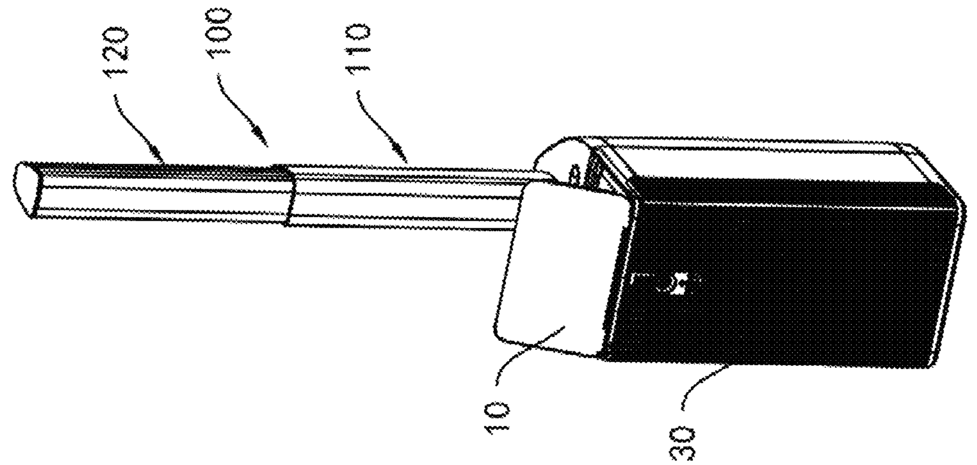
FIG. 21 is a schematic structural diagram of an intelligent audio device provided by an embodiment of the present disclosure with an open screen in a first mount position and a raised sound column assembly.
Figure 22:
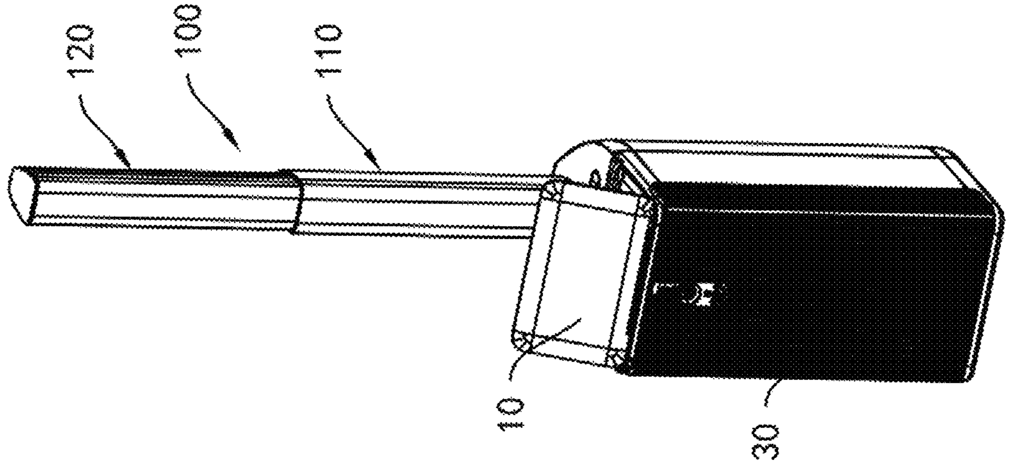
FIG. 22 is a schematic structural diagram of an intelligent audio device provided by an embodiment of the present disclosure with an horizontally flipped open screen in a first mount position and a raised sound column assembly.

Referring to FIG. 20, FIG. 21 and FIG. 22, the screen 10 and the first opening 220 are located on the same end surface of the enclosure 200, and the storage area 240 is located on one side of the first opening 220. Specifically, the movable connection member can be a hinged structure, such as a loose-leaf and a hinge, etc. It can be understood that, the movable connection member can also be a cross-axis structure, so that the screen 10 can rotate around the horizontal axis and the vertical axis, so that the display surface and the back surface of the screen 10 can face different directions to improve the degree of rotation of the screen 10.

Referring to FIG. 15 and FIG. 16, when the hinge structure connecting the screen 10 is located at the first mount position, when the screen 10 is flipped at the first mount position, the screen 10 does not interfere with the sound column assembly 100 when it is rotated to the extreme position, so as to avoid collision between the screen 10 and the sound column assembly 100 during use.

Referring to FIG. 21 and FIG. 22, when the hinge structure connecting the screen 10 is located at the second mount position, it is possible to avoid the flipped screen 10 from colliding with the extended sound column assembly 100, and to reduce the degree to which the screen 10 is blocked by the sound column assembly 100 during use.

Referring to FIG. 6, FIG. 7, FIG. 15 and FIG. 20, specifically, a third opening for placing the microphone may be configured on the bottom wall of the storage area 240, so that the third opening can be closed by a screen to protect the microphone.

Referring to FIG. 1 to FIG. 39, the method for controlling automatic lifting of a sound column according to the second aspect of the present disclosure includes the following steps:

S1: the sound column rises when a first preset condition is detected;

S2: the sound column adjusts the height when a second preset condition is detected;

S3: the sound column descends when a third preset condition is detected.

Through the method for controlling automatic lifting of a sound column, the sound column can be controlled to lift under the first preset condition, the second preset condition and the third preset condition respectively, so that the height of the sound column can be adjusted.

Figure 39:
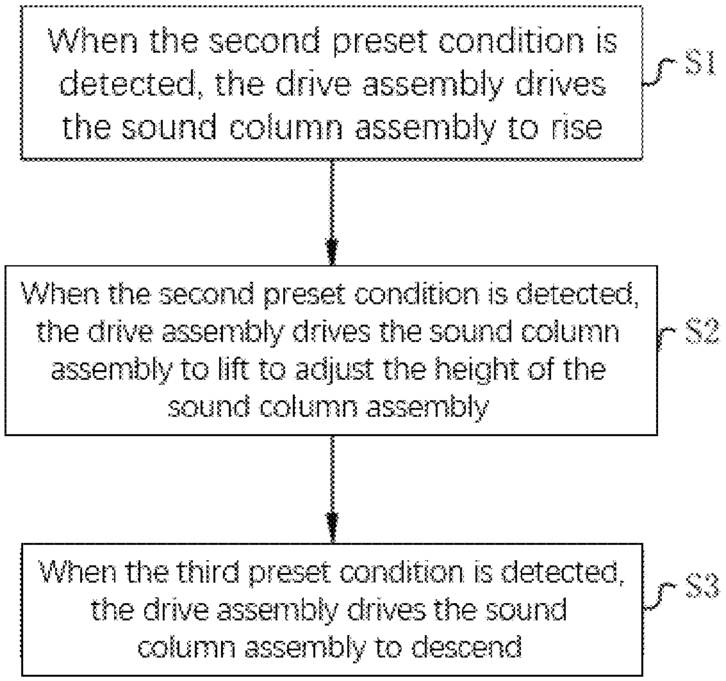
FIG. 39 is another flow chart of a method for controlling automatic lifting of a sound column provided by an embodiment of the present disclosure.

Specifically, the method for controlling automatic lifting of a sound column of the second aspect of the present disclosure can be applied to the intelligent audio device of the first aspect, referring to FIG. 39:

When the first preset condition is detected, the drive assembly 300 drives the sound column assembly 100 to rise. Specifically, the drive assembly 300 can drive the sound column housing 110 and/or the sound column body 120 to rise.

When the second preset condition is detected, the drive assembly 300 drives the sound column assembly 100 to lift to adjust the height of the sound column assembly 100. Specifically, the drive assembly 300 can drive at least one of the sound column housing 110 or the sound column body 120 to rise, and can also drive at least one of the sound column housing 110 or the sound column body 120 to descend.

When the third preset condition is detected, the drive assembly 300 drives the sound column assembly 100 to descend. The drive assembly 300 can drive at least one of the sound column housing 110 or the sound column body 120 to descend.

It can be understood that, the first preset condition includes at least one of the following: a power supply is turned on; the power supply is turned on and the sound column receives a rise instruction; the power supply is turned on and an environment meets a rise condition; the second preset condition includes: at least one of audio information of a file content or environment parameters of a playback space; the third preset condition includes at least one of the following: the power supply is turned off, a capacity of the power supply is less than or equal to a preset value of the power supply; the power supply is turned on and the sound column receives a descend instruction; the power supply is turned on and the environment meets a descend condition.

When the intelligent audio device needs to be used, the power supply needs to be turned on at first. When the power supply is detected to be turned on, the drive assembly 300 drives the sound column assembly 100 to rise. When the height of the sound column assembly 100 needs to be increased, a rise instruction can be issued to the sound column assembly 100 when the power supply is turned on. The sound column assembly 100 receives the rise instruction, and the drive assembly 300 drives the sound column assembly 100 to rise. In particular, the sound column may receive the command by mechanical energy sensing of sensors such as voice, buttons, rollers, infrared sensing gestures, etc. Specifically, when the sound column assembly 100 receives an erroneous rising correction command, the drive assembly 300 stops driving the sound column assembly 100 to rise, and the drive assembly 300 drives the sound column assembly 100 to descend to the height just-located. Specifically, the drive assembly 300 may be configured with a rising preset mode. After the sound column assembly 100 receives the rise instruction, the height can be automatically adjusted according to the mode selected by the user, and the sound column assembly 100 can be moved to a predetermined height under the driving of the drive assembly.

When the power supply is turned on and the surrounding environment meets the rise condition, the drive assembly 300 drives the sound column assembly 100 to rise. Specifically, the surrounding environment meets the rise condition can be whether the height space above the sound column assembly 100 is sufficient for the sound column assembly 100 to rise, so as to avoid the sound column assembly 100 from colliding with the structure above it. Therefore, a distance sensor can be provided, and the distance sensor can be configured to determine whether the height space above the sound column assembly 100 is sufficient. When the height space above the sound column assembly 100 is sufficient, the drive assembly 300 drives the sound column assembly 100 to rise to the second position, or to the highest position, for example the intelligent audio device is located in an outdoor environment. It can be understood that, the distance sensor can also determine whether there is enough space around the sound column assembly 100 to avoid collision between the sound column assembly 100 and the surrounding structures. Specifically, referring to FIG. 36 and FIG. 37, when the intelligent audio device is used indoors, after the sound column assembly 100 is extended from the first accommodation space 210, the distance between the sound column assembly 100 and the indoor ceiling is h1, and the distances between the sound column assembly 100 and the surrounding walls are h2 and h3 respectively. When the values of h1, h2 and h3 are less than the predetermined distances, the drive assembly 300 drives the sound column assembly 100 to be retracted into the first accommodation space 210 to protect the sound column assembly 100.

In particular, the distance sensor can be arranged on the enclosure 200, and can also be arranged on the sound column assembly 100. When the drive assembly 300 drives the sound column assembly 100 to rise, it can drive the sound column assembly 100 to move to a predetermined position according to specific circumstances, and can also drive the sound column assembly 100 to move to the highest position.

Specifically, the surrounding environment meets the rise condition can be whether the sound column assembly 100 is in an excessively tilted state. For example, the intelligent audio device is placed on an uneven outdoor grassy area. When the drive assembly 300 drives the sound column assembly 100 to rise, the center of gravity of the intelligent audio device will change. In order to prevent the intelligent audio device from tipping over, a horizontal sensor may be provided. The horizontal sensor may be configured to determine whether the sound column assembly 100 is in an excessively tilted state. When the horizontal sensor determines that the sound column assembly 100 is in an excessively tilted state, the drive assembly 300 stops driving the sound column assembly 100 to rise. In particular, the intelligent audio device may be installed with a support, and the drive assembly 300 drives the sound column assembly 100 to rise.

Specifically, after the intelligent audio device is connected to a plurality of other speakers, the greater the distance between the intelligent audio device and the other speakers, the higher the height to which the drive assembly 300 drives the sound column assembly 100 to rise. When the intelligent audio device is connected to two or more speakers, they are generally distributed equidistantly. The greater the distance between the intelligent audio device and the adjacent speakers, the higher the height to which the drive assembly 300 drives the sound column assembly 100 to rise.

When the intelligent audio device needs to be used, the audio information of the file content needs to be read and detected. According to other audio information such as the frequency, loudness, pitch and timbre of the audio of the file content to be played, the sound column assembly 100 can be driven to lift through the drive assembly 300 to adapt to different file contents.

When the intelligent audio device needs to be used, the drive assembly 300 can drive the sound column assembly 100 to lift according to the environment parameters of the playback space. Specifically, when the height space above the sound column assembly 100 is sufficient and the intelligent audio device is indoors, the drive assembly 300 drives the sound column assembly 100 to rise to the highest position. When the height space above the sound column assembly 100 is sufficient and the intelligent audio device is indoors, the drive assembly 300 drives the sound column assembly 100 to rise to a predetermined position.

When the intelligent audio device needs to be used, a descend instruction can be issued to the sound column assembly 100 when the power supply is turned on. The sound column assembly 100 receives the descend instruction, and the drive assembly 300 drives the sound column assembly 100 to descend. In particular, the sound column may receive the command by mechanical energy sensing of sensors such as voice, buttons, rollers, infrared sensing gestures, etc. Specifically, when the sound column assembly 100 receives an erroneous descending correction command, the drive assembly 300 stops driving the sound column assembly 100 to descend, and the drive assembly 300 drives the sound column assembly 100 to rise to the height just-located. Specifically, the drive assembly 300 may be configured with a descending preset mode. After the sound column assembly 100 receives the descend instruction, the height can be automatically adjusted according to the mode selected by the user, and the sound column assembly 100 can be moved to a predetermined height under the driving of the drive assembly.

When it is necessary to stop using the intelligent audio device, the power supply needs to be turned off at first. When it is detected that the power supply is turned off, the drive assembly 300 drives the sound column assembly 100 to descend and retract into the first accommodation space 210. When the power supply level is less than or equal to the preset power supply value, the drive assembly 300 drives the sound column assembly 100 to descend and retract into the first accommodation space 210, so as to avoid the sound column assembly 100 being still outside the first accommodation space 210 after the power supply is used out, which results in the need to manually retract the sound column assembly 100 into the first accommodation space 210, so as to reduce damage to the drive assembly 300. When the intelligent audio device is in a rainy environment, the drive assembly 300 drives the sound column assembly 100 to descend and retract into the first accommodation space 210.

Specifically, a distance sensor may be provided, by which it is possible to determine whether the height space above the sound column assembly 100 is sufficient. When the height space above the sound column assembly 100 decreases, the drive assembly 300 drives the sound column assembly 100 to descend, for example, the intelligent audio device is in an upward moving state. It can be understood that, the distance sensor may also determine whether the space around the sound column assembly 100 is sufficient. When an object is close to the sound column assembly 100, in order to avoid a collision between the sound column assembly 100 and the surrounding structures, the drive assembly 300 drives the sound column assembly 100 to descend. In particular, the distance sensor may be provided on the enclosure 200, or on the sound column assembly 100. When the drive assembly 300 drives the sound column assembly 100 to descend, it may drive the sound column assembly 100 to move to a predetermined position according to the specific situation, or it may drive the sound column assembly 100 to move into the first accommodation space 210.

Specifically, the step S2: the sound column adjusts the height when a second preset condition is detected, is not a essential step. An optional lifting mode of the intelligent audio device is: power on, a first preset condition is detected, the sound column rises to the highest position; power off, a third preset condition is detected, the sound column descends to the lowest position, so that the sound column is stored in the first accommodation space 210.

Specifically, the drive assembly 300 can drive the sound column housing 110 and the sound column body 120 to lift simultaneously, or the drive assembly 300 can drive the sound column housing 110 and the sound column body 120 to lift separately.

Referring to FIG. 26, FIG. 27, FIG. 28 and FIG. 29, it can be understood that a cross-section of the first opening 220, a cross-section of the sound column body 120 and a cross-section of the sound column housing 110 are all non-circular cross-sections.

Specifically, the outer wall of the sound column housing 110 abuts against the inner wall of the first opening 220, and the inner wall of the sound column housing 110 abuts against the outer wall of the sound column body 120, so as to avoid the sound column housing 110 and the sound column body 120 from being driven to rotate when the first screw rod 310 and the second screw rod 320 rotate synchronously, so that the stability of moving in the first direction of the sound column housing 110 and the sound column body 120 is improved.

Referring to FIG. 1 and FIG. 3, specifically, the intelligent audio device also includes a front mesh housing 30, a top housing 60 and a bottom housing 70. The top housing 60 and the bottom housing 70 are respectively arranged on opposite sides of the enclosure 200. The top housing 60 and the bottom housing 70 are specifically distributed up and down, with the enclosure 200 arranged in the middle. A second accommodation space 230 for accommodating the loudspeaker assembly 40 is arranged in the enclosure 200, and the top housing 60 is configured with a second opening communicated to the second accommodation space 230.

In particular, the orientation of the loudspeaker assembly 40 can be consistent with the orientation of the first housing 201, the sound direction of the sound column assembly 100 and the sound direction of the low-frequency loudspeaker; a plurality of air ducts 20 can be provided, and the length direction of the air ducts 20 is toward the first housing 201.

The front mesh housing 30 is connected to the enclosure 200. The front mesh housing 30 is in the shape of a fence plate. The front mesh housing 30 can have various striped structures, such as wood grain, and can also be made of various materials, such as wood. The front mesh housing 30 is provided with a button area, and various buttons can be provided in the button area. The intelligent audio device can be controlled by pressing the buttons.

The second housing 202 is configured with amount position for mounting the front mesh housing 30. The adjacent front mesh housings 30 can be installed by plugging, clamping, gluing, screwing, hot melting, ultrasonic welding, or welding.

At least one recess 50 is arranged on the rear side of the enclosure 200, and the recess 50 is configured to dispose an interface or other structures.

The loudspeaker assembly 40 of the second accommodation space 230 preferably only operates the low-frequency loudspeaker. In the case of the two-stage lifting of the sound column assembly 100, the high frequency and full frequency of the sound column assembly 100 have met the requirements of the sound field. Moreover, the distance between the loudspeaker assemblies 40 is maximized, the sound field has been fully released and strengthened, and the diffusion range has reached the limit.

In some embodiments, the intelligent audio device is configured with a storage structure, which can be a cavity for accommodating a microphone, the microphone is Plug-in storage, the depth of the cavity is greater than or equal to the length of the microphone, the cavity for accommodating the microphone includes a third opening, through which the microphone is vertically or horizontally inserted into the cavity along the length direction to achieve storage. A microphone fixing structure can be provided inside or outside the third opening to fix the microphone after it is stored, and the third opening can be arranged at any position of the intelligent audio device, including the top surface, side surface, and bottom surface of the intelligent audio device. The storage structure can also be a groove, the microphone is embedded in the groove, the microphone is Put-in storage. A microphone fixing structure can be provided inside or outside the groove to fix the microphone after it is stored, the microphone is vertically or horizontally placed into the groove along a direction perpendicular to the length direction of the microphone to achieve storage. The groove can be arranged at any position of the intelligent audio device, including the top surface, side surface, and bottom surface of the intelligent audio device.

Referring to FIG. 4, FIG. 15 and FIG. 16, specifically, the microphone can be stored automatically or manually. In particular, a third opening, a barrel and a motor structure can be provided in the enclosure 200. The barrel is configured with a storage space for accommodating the microphone, the microphone can be placed into the barrel from the third opening, the barrel is arranged in the second accommodation space 230, and the barrel is arranged at the third opening, the motor is connected to the barrel to drive the barrel to move up and down to realize automatic storage of the microphone. It can be understood that, a third opening and a barrel can be provided in the enclosure 200, the barrel is configured with an accommodation space for accommodating the microphone, the microphone can be placed into the barrel from the third opening to realize manual storage.

In some embodiments, the microphone is automatically turned off by a sense element sensing the distance between the intelligent audio device and the microphone. After the distance between the intelligent audio device and the microphone is sensed less than or equal to a preset distance, the microphone is automatically turned off. The sense element may be one or more, and the sense element may be a Hall element, a distance sensor, an infrared sensor, or any other single electronic component that can sense the distance between the intelligent audio device and the microphone, or any combination of electronic components. The sense element can be arranged on at least one of the intelligent audio device or the microphone. Specifically, when the microphone is inserted into the cavity, the sense element can be arranged at the third opening of the cavity that stores the microphone, so that the microphone can be turned off immediately when the microphone is just inserted into the third opening. The sense element can also be arranged at one end of the cavity away from the third opening to prevent the sense element from being exposed to the outside due to the third opening facing outward, which may cause aging of the element. When the microphone is embedded into the groove, the sense element can be arranged at one end, the middle, or both ends of the groove.

In some specific embodiments, the sense element is a Hall element, the storage structure and the microphone of the intelligent audio device have corresponding positions respectively. A magnetic member is arranged at the corresponding position of the microphone and the Hall element is arranged at the corresponding position of the intelligent audio device, or the Hall element is arranged at the corresponding position of the microphone and a magnetic member is arranged at the corresponding position of the intelligent audio device. The trigger condition of the Hall element may be that the detected magnetic field strength reaches a preset value. When the detected magnetic field strength is greater than or equal to the preset value, it means that the distance between the intelligent audio device and the microphone is sufficient to cause howling, and the microphone needs to be turned off. Preferably, the magnetic member is arranged at the corresponding position of the microphone and the Hall element is arranged at the corresponding position of the intelligent audio device. Since the microphone moves everywhere during karaoke, it may move to other places with large magnetic field strength. The configuration of the Hall element on the microphone may cause the microphone to shut down incorrectly, so as to affect the experience. The microphone can be Plug-in storage, and the Hall element is arranged at the third opening or at one end away from the third opening. It can be understood that the microphone can be Put-in storage, and the Hall element is arranged at one end, the middle, or both ends of the groove.

In some specific embodiments, the sense element is a Hall element, the intelligent audio device is configured with a power charging structure, and the microphone is configured with a corresponding power receiving structure. The trigger condition of the Hall element may be a change in the magnetic field caused by the moment when the microphone is energized for charging. When the magnetic field change is detected, it means that the distance between the intelligent audio device and the microphone is sufficient to cause howling, and the microphone needs to be turned off. The power charging structure can be arranged on the surface of the intelligent audio device, or it can be arranged corresponding to the storage structure. The microphone can be Plug-in storage. The power charging structure is arranged at one end of the cavity structure of the intelligent audio device away from the third opening. A power receiving structure is correspondingly arranged at the bottom or on the bottom surface of the end of the microphone, and the Hall element is arranged near the power charging structure. The Hall element can sense the changes in the magnetic field caused by the moment when energized. The microphone can be Put-in storage, and the power charging structure is arranged at one end, the middle, or both ends of the groove of the intelligent audio device. The microphone is configured with a power receiving structure correspondingly. The Hall element is arranged near the power charging structure. The Hall element can sense the changes in the magnetic field caused by the moment when energized. The power charging structure can be Plug-in charging probe, and the contact is established between one or more of the charging probe and the wireless charging structure.

In some specific embodiments, the sense element is a Hall element, and the intelligent audio device is configured with a power charging structure correspondingly, and the storage structure and the microphone are respectively configured with a magnetic member. The magnetic member fixes the microphone, and the magnetic member is arranged outside the range of sensing trigger of the Hall element. The microphone can be Put-in storage, and the power charging structure is arranged at one end, the middle, or both ends of the groove of the intelligent audio device. The microphone is configured with a power receiving structure correspondingly, and the Hall element is arranged near the charging structure. The Hall element can sense the change in the magnetic field caused by the moment when energized. Preferably, the charging structure is arranged at a bottom end of a first accommodation groove, and the magnetic member is arranged at another end or the middle of the first accommodate groove. When the microphone is cylindrical, a button is arranged on the surface of the microphone, and the magnetic member is arranged on the other side opposite to the button, so that the button of the microphone faces the outside of the groove.

Specifically, in order to prevent the microphone from damaging the structure of the screen 10 on the intelligent audio device, a sense structure can be provided. When the screen is closed, the sense structure can sense the position of the structure of the screen 10, so that the microphone drops quickly, or prompt the user through the speaker that the microphone and the screen 10 may interfere with each other.

It should be noted that, in this disclosure, relational terms such as first and second, etc. are merely intended to distinguish one entity or operation from another entity or operation, and do not necessarily require or imply any actual relationship or order between these entities or operations. Moreover, the terms "comprise," "include," or any other variations thereof are intended to cover non-exclusive inclusion, such that a process, method, article, or apparatus that includes a list of elements includes not only those elements but also other elements not expressly listed, or also includes elements inherent to such process, method, article, or apparatus.

Although embodiments of the present disclosure have been shown and described, it will be appreciated by those skilled in the art that various changes, modifications, substitutions and variations may be made to the embodiments without departing from the principles and spirit of the present disclosure, and that the scope of the present disclosure is defined by the appended claims and their equivalents.

The above embodiments are only intended to illustrate the technical solutions of the present disclosure, rather than to limit the same. Although the present disclosure has been described in detail with reference to the aforementioned embodiments, those ordinary skilled in the art should understand that the technical solutions described in the aforementioned embodiments may still be modified, or some of the technical features thereof may be replaced by equivalents. However, these modifications or replacements do not deviate the essence of the corresponding technical solutions from the spirit and scope of the technical solutions of the embodiments of the present disclosure.

What is claimed is:

1. An intelligent audio device comprising:

a sound column assembly;

an enclosure configured with at least one first accommodation space, wherein one end of the at least one first accommodation space extends to an outer wall of the enclosure to form a first opening, the at least one first accommodation space is configured to accommodate the sound column assembly;

a drive assembly connected to the sound column assembly, wherein the drive assembly is configured to drive the sound column assembly to reciprocate between a first position and a second position; and wherein, when the sound column assembly is located at the first position, the sound column assembly is located in the at least one first accommodation space; and when the sound column assembly is located at the second position, the sound column assembly is at least partially located outside the at least one first accommodation space, wherein the sound column assembly comprises a sound column body and a sound column housing; the sound column body is connected to the sound column housing; and the drive assembly drives at least one of the sound column housing or the sound column body, so that the sound column body or the sound column housing moves, wherein the sound column housing is arranged to be penetrated through and sleeved outside the sound column body; the sound column body is slidably connected to the sound column housing and is configured to slide relative to the sound column housing along a first direction; the drive assembly is connected to the sound column body and the sound column housing, and the drive assembly is configured to drive the sound column housing to at least partially move from the first opening outside the at least one first accommodation space, and is configured to drive the sound column body to at least partially move outside the sound column housing, wherein the drive assembly comprises a drive member and a first screw rod; the first screw rod is threadedly connected to the sound column housing; and the drive member drives the first screw rod, so that the first screw rod rotates around the first direction, wherein the drive assembly further comprises a second screw rod; the drive member drives the second screw rod, so that the second screw rod is configured to rotate; and the second screw rod is threadedly connected to the sound column body, wherein the second screw rod is rotatably connected to the sound column housing; the second screw rod is arranged to be penetrated through, the second screw rod is slidably sleeved on the first screw rod; at least one of the first screw rod or the second screw rod is configured with a chute, at least another one of the second screw rod or the first screw rod is configured with a slider; the slider is slidably arranged in the chute; and an extension direction of the chute is arranged in a same direction as an axial direction of the first screw rod.

2. The intelligent audio device according to claim 1, wherein the drive assembly comprises a third screw rod, and the drive member drives the third screw rod;

the third screw rod is threadedly connected to at least one of the sound column housing or the sound column body, and the drive member drives the third screw rod to rotate, so as to drive the sound column housing and the sound column body to reciprocate, or the third screw rod is threadedly connected to the sound column body, and the drive member drives the third screw rod to rotate, so as to drive the sound column body to reciprocate.

3. The intelligent audio device according to claim 1, wherein the sound column housing comprises a first main body and a first nut; the first nut is fixedly connected to the first main body and is threadedly connected to the first screw rod; the sound column body comprises a second main body and a second nut; and the second nut is fixedly connected to the second main body and is threadedly connected to the second screw rod.

4. The intelligent audio device according to claim 3, wherein the first main body is configured with a first through opening, and the second main body is configured with a second through opening; the first through opening and the second through opening are arranged opposite to each other; the first nut is arranged at the first through opening; the second nut is arranged at the second through opening; the first screw rod is arranged through the first through opening, and the first screw rod is at least partially located in the first main body; the second screw rod is arranged through the second through opening, and the second screw rod is at least partially located in the second main body.

5. The intelligent audio device according to claim 1, wherein the sound column housing comprises a first main body, a connect member and a limit member, wherein the connect member is connected to the second screw rod, the limit member is connected to the first main body, and a placement cavity is defined between the limit member and the first main body; and the connect member is rotatably arranged in the placement cavity.

6. The intelligent audio device according to claim 1, wherein the enclosure is further configured with a second accommodation space; and the second accommodation space is in communication with the at least one first accommodation space, or the second accommodation space is separated from the at least one first accommodation space.

7. The intelligent audio device according to claim 6, wherein the second accommodation space is in communication with the at least one first accommodation space; one end of the sound column housing is connected to the sound column body; and when the sound column body is located in the second position, a second end of the sound column housing away from the sound column body is located between the sound column body and the enclosure.

8. The intelligent audio device according to claim 1, wherein a cross-section of the first opening, a cross-section of the sound column body and a cross-section of the sound column housing are all non-circular cross-sections.

9. The intelligent audio device according to claim 1, further comprising a screen assembly, wherein the screen assembly comprises a screen, and the screen is movably connected to the enclosure.

10. The intelligent audio device according to claim 9, wherein the enclosure is configured with a storage area, and the storage area is configured to store the screen.

11. The intelligent audio device according to claim 10, wherein the screen assembly further comprises a movable connection member; the storage area and the first opening are both located on an end surface of the enclosure, the storage area is located on one side of the first opening, and the movable connection member is arranged at a first mount position or a second mount position of the storage area; and the second mount position is located away from the first opening relative to the first mount position and is spaced apart from the first mount position.

12. The intelligent audio device according to claim 1, wherein the intelligent audio device is configured with a storage structure, and the storage structure is configured for accommodating a microphone.

13. The intelligent audio device according to claim 12, wherein the storage structure comprises a third opening, a barrel and a motor structure, the third opening is arranged in the enclosure, the barrel is arranged at the third opening and configured with a storage space for accommodating the microphone, and the motor structure is connected to the barrel to drive the barrel to move.

* * * * *